(12) United States Patent
De Haan et al.

(10) Patent No.: US 10,567,826 B2
(45) Date of Patent: Feb. 18, 2020

(54) METHOD FOR ENCODING, VIDEO PROCESSOR, METHOD FOR DECODING, VIDEO DECODER

(71) Applicant: KONINKLIJKE PHILIPS N.V., Eindhoven (NL)

(72) Inventors: Wiebe De Haan, Eindhoven (NL); Leon Maria Van De Kerkhof, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 213 days.

(21) Appl. No.: 15/525,103

(22) PCT Filed: Nov. 4, 2015

(86) PCT No.: PCT/EP2015/075651
§ 371 (c)(1),
(2) Date: May 8, 2017

(87) PCT Pub. No.: WO2016/074999
PCT Pub. Date: May 19, 2016

(65) Prior Publication Data
US 2018/0278985 A1    Sep. 27, 2018

(30) Foreign Application Priority Data

Nov. 10, 2014 (EP) .................... 14192484

(51) Int. Cl.
*H04N 19/182* (2014.01)
*H04N 19/98* (2014.01)
*H04N 21/426* (2011.01)
*H04N 21/485* (2011.01)
*H04N 21/845* (2011.01)

(52) U.S. Cl.
CPC ..... *H04N 21/42653* (2013.01); *H04N 19/182* (2014.11); *H04N 19/98* (2014.11); *H04N 21/4854* (2013.01); *H04N 21/845* (2013.01)

(58) Field of Classification Search
CPC .............. H04N 19/182; H04N 19/98; H04N 21/42653; H04N 21/4854; H04N 21/845
See application file for complete search history.

(56) References Cited

U.S. PATENT DOCUMENTS 7,158,668 B2 * 1/2007 Munsil ................ H04N 1/4053
382/162
8,248,486 B1 8/2012 Ward et al.
8,872,969 B1 10/2014 Raithi et al.
(Continued)

FOREIGN PATENT DOCUMENTS

WO 2005104035 A1 11/2005
WO 2011103258 A2 8/2011
(Continued)

*Primary Examiner* — Sing-Wai Wu

(57) ABSTRACT

In a video processing system, such as e.g. a set top box or a BD player wherein in a merger video can be merged with one or more overlays a video/overlay pixel indication (A) is encoded in one or more of the least significant bits of one or more of the color components in the video signal. The video signal is transmitted over the interface between VPS and display. The display subject the image to an adaptation. This adaptation is performed dependent on the video/overlay pixel indication (A).

19 Claims, 20 Drawing Sheets

(56) References Cited

U.S. PATENT DOCUMENTS

2012/0321273 A1* 12/2012 Messmer ............. G11B 27/031
                                                              386/224
2014/0125696 A1    5/2014  Newton et al.
2015/0156469 A1    6/2015  Qu et al.
2016/0105695 A1*  4/2016  Qu ..................... H04N 21/2353
                                                              348/708

FOREIGN PATENT DOCUMENTS

| WO | 2011107905 A1 | 9/2011 |
| WO | 2012147022 A2 | 11/2012 |
| WO | 2012153224 A1 | 11/2012 |
| WO | 2014056679 A1 | 4/2014 |
| WO | 2014130213 A1 | 8/2014 |
| WO | 2016020189 A1 | 2/2016 |

* cited by examiner

METHOD FOR ENCODING, VIDEO PROCESSOR, METHOD FOR DECODING, VIDEO DECODER

CROSS-REFERENCE TO PRIOR APPLICATIONS

This application is the U.S. National Phase application under 35 U.S.C. § 371 of International Application No. PCT/EP2015/075651, filed on Nov. 4, 2015, which claims the benefit of European Patent Application No. 14192484.5, filed on Nov. 10, 2014. These applications are hereby incorporated by reference herein.

FIELD OF THE INVENTION

The invention relates to encoding a video image, in particular a high dynamic range image, and corresponding technical systems and methods to convey the necessary coded image information to a receiving side, and decoders to decode the coded images, and ultimately make them available for display.

BACKGROUND OF THE INVENTION

Classical image/video technology (starting with analogue systems like NTSC and PAL, and continuing with digital video codecs like MPEG 1, MPEG 2, MPEG 4 etc.), utilizes what we now call Low Dynamic Range (LDR) or Standard Dynamic Range (SDR) coding. It is now widely recognized that for bringing a more immersive experience to the consumer, the next step in video technology needs to be the enhancement of dynamic range and peak brightness of the video signal. Research and development has begun from a number of single or groups of companies to come to the next generation of video codec, which is capable of handling so called High Dynamic Range (HDR) images of HDR scenes. These developments find their base in the notion that LDR signals cannot capture the dynamic range of real life scenes, cannot represent the dynamic range of what the human visual system can see, and therefore cannot transfer the full emotional experience in a scene to the consumer. Often, HDR is seen as a necessary feature for Ultra High Definition (UHD) television, i.e. with a display resolution of 3840× 2160 pixels ("4k"), but HDR is also seen as a convincing feature on its own, e.g. in combination with HD resolution video.

Capturing HDR images requires a camera which can capture the increased dynamic range of at least above 11 stops, but preferably above 16 stops. Current cameras of e.g. ARRI, RED and Sony are achieving about 14 stops. Some HDR cameras use a slow and fast exposure and combine those in a single HDR image, other cameras use beam splitting towards two or more sensors of different sensitivity.

Whereas in classical imaging a lot of information was thrown away (hard clipped, e.g. the outside view from a room or car), present imaging systems can capture all that information, and the question is what to do with it then. Further, higher dynamic range displays are emerging, which have higher peak brightness than the currently typical 350 nit (or 100 nit for grading reference monitors). Televisions with a peak brightness of around 1000 nits are now entering the consumer market, and SIM2 has a 5000 nit professional monitor in their portfolio.

Display units are currently being developed that are able to provide a high brightness level and a very high contrast between dark parts of the image and bright parts of the image. For fully exploiting the capabilities of such displays, video information may be enhanced by providing adapted video information, e.g. taking into account the higher brightness and the HDR contrast range. For distinguishing from HDR, the traditional video information is called low dynamic range [LDR] video in this document. As such, LDR video information may be displayed on an HDR display unit in HDR display mode for improved contrast. However, a more compelling image is achieved when the video information itself is generated in an HDR video format, e.g. exploiting the enhanced dynamic range for better visual effects or for improving visibility of textures in bright or dark areas while avoiding visual banding. In addition to enhancing the precision of the image data, movie directors can locally enhance the experience, by e.g. emphasizing explosions, and/or improve visibility in bright or dark scenes/areas.

Standard developing organizations are rethinking the various video format parameters that determine the picture quality. Among these is the dynamic range. The dynamic range becomes more important with increasing peak brightness of the display. While most video content is still graded for 100 nits (cd/m2) displays, the brightness of modern commercial displays is usually already much higher (typically around 350 nits, but going up to say 600-800 nits). Professional displays with a brightness of around 4000 nits are already available. These displays are able to provide a much more life-like viewing experience.

In short HDR images are becoming more and more important. An HDR image may be an image which encodes the textures of an HDR scene (which may typically contain both very bright and dark regions) with sufficient information for high quality encoding of the color textures of the various captured objects in the scene, such that a visually good quality rendering of the HDR scene can be done on an HDR display with high peak brightness, like e.g. 5000 nit. A typical HDR image comprises brightly colored parts or parts strongly illuminated compared to the average illumination. Especially for night scenes HDR becomes more and more important.

In contrast with day scenes in which sun and sky illuminate each point the same, at night there may be only some light sources, which light the scene in a quadratically reducing manner. This creates bright regions around a light source, and dark regions in faraway corners. Some parts get almost no light from anywhere, making it very dark. I.e. in a night scene there may at the same time be parts having region luminances (or when captured by a linear camera pixel luminances) of above 10,000 nit for the lamps themselves, and fractions of a nit, e.g. 0.001 nit for the dark regions, making the total dynamic range 10 million to 1. This being the theoretical range for the brightest versus darkest pixel, the useful dynamic range may of course be lower, since one may not need to accurately represent a couple of small lamps or a small dark patch, but in typical HDR scenes even the useful dynamic range of the normal objects of interest may be well above 10,000:1 (or 14 stops). Mapping this to a display of 2000 nit peak brightness means that it should "theoretically" (assuming the relative to peak white rendering is sufficient for visual quality of the scene rendering) have a minimum (visible) black of for instance 0.2 nit.

HDR video (or even still image) encoding has only recently been researched. The typical belief is that one either needs to go towards significantly more bits, for encoding the brightnesses above the LDR range of scene objects (e.g. encodings which encode scene luminances directly), or one needs some two-layer approach, wherein e.g. in addition to an object reflectance image there is an illumination boost image, or similar decomposition strategies. A two layer HDR encoding approach has been published for instance in U.S. Pat. No. 8,248,486B1 and WO2005/1040035.

A simpler single image approach is disclosed in WO2011/107905 and WO2012/153224. This approach is based upon parametric encoding. In addition to simply encoding a single HDR image suitable for displays with a peak brightness at a reference value, e.g. 1500 nit, this approach also addresses displays with other peak brightnesses and dynamic ranges out there. Since there will also be displays of e.g. 500 or 100 nit, rather than to leave it blindly to the receiving side how to change the encoded high dynamic range image to some reasonable image by auto-conversion, color processing functions are co-encoded how to arrive at an appropriate image for the specific properties of the display, starting from the encoded HDR image. This process then results into an image optimized for that specific display, that a content creator could agree with.

With "high dynamic range" (HDR) images, we typically mean images as captured from the capturing side that have 1) a high luminance contrast ratio compared to legacy LDR encoding (i.e. contrast ratios of 10.000:1 or more); and 2) object luminances no less than 500, 700 or typically 1000 nits. An HDR coding system needs then to be capable of encoding this wide contrast ratio and high object luminances. An HDR reproduction system will typically reproduce highlights above 1000 nit to generate some desired appearance of say a lit lamp or sunny exterior.

The HDR image is to be displayed on a display. As already is the case with current commercial displays, future HDR displays will have different peak brightness levels depending on technology, design choices, cost considerations, market factors, etc. The video signal received by the display will usually be graded for a specific reference display, which may not correspond to the characteristic of the display on which the video signal is to be presented. The display receiving the HDR signal tries to adapt the video signal to match its own characteristics, including peak brightness level. If the receiver/display has no knowledge about the characteristics of the video signal and/or the grading that was applied, the resulting picture might not be in line with the artistic intent or might simply look bad. Therefore, dynamic range adaptation parameters/instructions may be and preferably are included with the video or conveyed otherwise to the display to provide processing information for optimizing the picture quality for the peak brightness level and other characteristics of the display on which the signal is displayed. The adaptation parameters may operate on the whole picture area or may be constrained to certain areas of the picture.

Alternatively, the HDR display may on its own adapt the incoming HDR signal for instance if it knows the characteristics for the incoming signal, for instance if a standard has been used.

By whatever method, the display therefore adapts the incoming e.g. HDR signal. For simplicity HDR signal is mentioned here, the incoming signal could also be an LDR signal which is then displayed in HDR mode (note that this LDR signal may, although it is by itself suitable for direct display on an LDR display, implicitly be an encoding of an HDR image look, because it contains all necessary pixel color data which can be functionally mapped to a HDR image by co-encoded functions). More specifically the display performs a dynamic range adaptation on the incoming signal for adjusting it to its characteristics (e.g. peak intensity, black level) before displaying it.

The display applies a mapping function which maps the incoming HDR (or LDR) data on a set of HDR data which best (or at least better or at least such is the intention) fits the capabilities of the display, such as e.g. black level and peak brightness level of the display. The so adapted HDR data is used for displaying the image on the display.

The mapping can be an upgrading of the image wherein the dynamic range of the displayed image is larger than the dynamic range of the original image as well as a downgrading of the image wherein the dynamic range is smaller than the dynamic range of the original image.

The effect of the dynamic range adaptation (below this will also sometimes be called "boost", although when downgrading is performed the image is diminished rather than increased in dynamic range) is often most noticeable for very bright objects.

The video signal may be provided to the home in various ways, including through broadcast, through the internet or via packaged media. It may for instance be received by a set top box (STB) or via another video processing system as a compressed stream.

The set top box decodes the video and subsequently sends it as baseband video to the television set. In another example the coded video is stored on a storage medium, e.g. a DVD/Blu-ray disc or a Flash drive. In that case the playback device (media player MP) reads the content from the medium, decodes the compressed video and sends it to the television set. In both cases the separate box (VPS, video processing system) is connected with the TV through a standard interface (e.g. HDMI, Display Port, or a wireless video interface).

Typically set top boxes (STB) and media players (MP) do not simply pass the decoded video, but at some times merge the video with one or more graphics layers. For example in the case of Blu-ray Disc (BD) there are often 2 overlay layers: Presentation Graphics (PG) for subtitles and the graphics plane from the java engine (BD-J), e.g. for menu overlays. On top of those graphics planes there can be an additional plane for the user interface of the player.

While extending the existing video systems for HDR the high contrast ratio available in advanced display devices is used to achieve vivid and realistic video images. However, it has been found that, when overlaying graphics in such a HDR display mode, several problems may occur. For example, a problem that can occur with (semi-transparent) graphics overlays on top of HDR video is that some scenes in HDR video can be exceptionally bright. This will significantly reduce the legibility of the graphics such as subtitles or menus shown at the same time. Another problem that can occur is that the characters in the subtitles might become so bright that it becomes annoying or fatiguing for the reader. Also extreme bright subtitles or menus may cause halo effects or glare and thus degrade the perceived quality of the video.

Problems may occur both when the dynamic range is increased (from an LDR or low HDR to a higher HDR range) as well as when it is decreased (from a HDR to a lower dynamic range HDR or LDR). The dynamic range adaptation may be on the basis of parameters that are sent along with the video, based upon an analysis of the image in the TV, based upon information sent along with the video signal, or any other method. The dynamic range adaptation applies to the underlying video, not for the areas that contain the graphics overlays. The dynamic range adaptation may change at certain instances (e.g. when the scene is changing), while subtitles or a menu overlay may be fixed during the change. This may e.g. result in unwanted changes in the appearance of the graphics at scene boundaries.

In US0240125696 a solution has been described wherein the overlays are adjusted in dependence on the display mode. Prior to merging (or while merging) an overlay with a video signal (which could be an LDR or an HDR signal) the overlay is adapted (or the merging is adapted) in dependence on the display mode.

However, this requires an input for the display mode and for HDR processing instructions. Furthermore, displays are different and all have there own characteristics. Therefore the same adaptation of an overlay for the same display mode may not give the same result on different displays. This would require knowledge of the display characteristics.

Hence, an improved approach for adapting video would be advantageous and in particular an approach allowing increased flexibility, improved dynamic range adaptation, improved perceived image quality, improved overlay and/or video image presentation (in particular when changing dynamic range) and/or improved performance would be advantageous

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for decoding an HDR video signal merged from more than one source signal, the apparatus comprising: an input for receiving the HDR video signal, a reader for reading at least one or more least significant bits for one or more color components of the HDR video signal for a pixel and generating one or more values from the read least significant bits, the one or more values indicating a merging property for the pixel, the merging property being indicative of a property of a merging in the HDR video signal for that pixel of one or more overlay signals with a video image signal; and an adapter for adapting the HDR video signal, and wherein the adapter is arranged to adapt a pixel value in dependence on the one or more values.

The invention may provide improved performance in many embodiments. In many systems, it may provide improved rendering of images and video sequences comprising overlay on displays with different dynamic ranges.

The apparatus may be a video decoder, and specifically may be comprised in a display, such as in a television or monitor. The adapter may be arranged to perform a dynamic range adaptation on the pixel in dependence on the one or more values.

The more than one source signals may include (or consist in) the one or more overlay signals and the video image signal. The source signals may be video signals which at the encoding side is combined into a single video signal (the HDR video signal).

In accordance with an optional feature of the invention, the apparatus comprises an input for a signal including information on which least significant bits to read and how to convert them to the one or more values.

In some embodiments, the apparatus is arranged to receive data indicative of an encoding of the one or more values in the HDR video signal, and the reader is arranged to determine the one or more values in response to the data indicative of the encoding.

In accordance with an optional feature of the invention, the adapter is arranged to perform a dynamic range adaptation on image pixels of the HDR video signal.

In accordance with an optional feature of the invention, the adapter is arranged to adapt a mapping from an input dynamic range of the HDR video signal to an output dynamic range for the pixel in dependence on the one or more values.

In accordance with an optional feature of the invention, the one or more values is indicative of a percentual contribution to the pixel from the video image signal relative to a percentual contribution from one or more overlay signals; and the adapter is arranged to apply a different mapping for different percentual contributions.

The term percentual may indicate a percentage/proportion/ratio for a contribution of the pixel value originating from a given source.

In accordance with an optional feature of the invention, the apparatus comprises: an estimator for splitting the HDR video signal into a plurality of estimated signals, based on an estimate of a contribution of the video image signal and one or more overlay signals to pixels of the HDR video signal; a mixer for remixing the plurality of estimated signals following the adaptation and wherein the adaptor is arranged to separately adapt at least one of the plurality of estimated signals.

The contribution(s) may be indicated by the one or more values. The adaptation may be different for at least two of the estimated signals.

In accordance with an optional feature of the invention, the merging property is indicative of a merging type.

The merging type may specifically indicate whether the merging of the pixel is one from a group of possibly merging operations including at least one of: the merging includes a contribution only from the video image signal; the merging includes a contribution only from one overlay signal; the merging includes a contribution from both the video image signal and from at least one overlay signal.

In accordance with an optional feature of the invention, the merging property for a pixel is indicative of an amount of merging of the video image signal and the one or more overlay signals for said pixel.

The amount of merging may reflect a weight of at least one of the one or more overlay signals relative to a weight of the input video image signal. The merging may be a weighted summation In accordance with an optional feature of the invention, the adapter is arranged to, prior to adaptation, split the HDR video signal into more than one estimated signals estimating at least some of the one or more overlay signals and the video image signal based on an estimate of contribution of the at least some of the one or more overlay signals and the video image signal to a pixel value of the HDR video signal, where after at least one of the estimated signals is color transformed to adapt its luminance, and the more than one estimated signals are remixed following adaptation.

In accordance with an optional feature of the invention, the merging property may be indicative of the pixel comprising first overlay content, the first overlay content originating from at least one of an overlay signal comprising locally generated graphic content or an overlay signal comprising a second video image signal which includes merged overlay content.

In accordance with an optional feature of the invention, the adapter is arranged to adapt pixels within a region for which the merging property is indicative of the pixel comprising first overlay content to have output luminances within a predetermined range.

The predetermined range may e.g. for a display be a preset range reflecting the dynamic of the display. E.g. the range may have an upper limit of, say, 10% of the peak brightness, and a lower limit of e.g. the larger of 1% of peak brightness and 1 nit. Alternatively or additionally, the predetermined range may be determined by the viewer etc.

According to an aspect of the invention there is provided a method of decoding an HDR video signal merged from more than one source signal, the method comprising: receiving the HDR video signal, reading at least one or more least significant bits for one or more color components of the HDR video signal for a pixel and generating one or more values from the read one or more least significant bits, the one or more values indicating a merging property for the pixel, the merging property being indicative of a property of a merging in the HDR video signal of one or more overlay signals with a video image signal for that pixel; and adapting a pixel value in dependence on the one or more values.

According to an aspect of the invention there is provided an apparatus for encoding a video signal, the apparatus comprising: a merger for merging an input HDR video image signal with one or more overlay signals to form a merged video signal, a processor for generating one or more values indicating for a pixel in the merged video signal a merging property indicative of a property of the merging for that pixel; and an encoder for encoding for said pixel said one or more values in one or more least significant bits of one or more color components of a pixel value for the pixel in the merged video signal.

In accordance with an optional feature of the invention, the image property is indicative of at least one of a merging type for said pixel and of an amount of merging of the input HDR video image signal and the one or more overlay signals.

In accordance with an optional feature of the invention, the encoder is arranged to provide to the merged video signal an information signal comprising information on a property of the encoding of the one or more values in the one or more least significant bits.

According to an aspect of the invention there is provided a method of encoding a video signal, the method comprising: merging an input HDR video image signal with one or more overlay signals to form a merged video signal, generating one or more values indicating for a pixel in the merged video signal a merging property indicative of a property of the merging for that pixel; and encoding for said pixel said one or more values in one or more least significant bits of one or more color components of a pixel value for the pixel in the merged video signal.

In some embodiments, a method of encoding may comprise adding to a video image signal one or more overlay signals to form a merged video signal, generating one or more values for a pixel a merging type and/or one or more merging parameters in the merged video signal and encoding for said pixel said one or more values in one or more least significant bits from one or more color components of the merged video signal A video processor may comprise a merger for merging a video image signal and one or more overlays, typically graphics signals, to form a merged video signal, and an image encoder for generating or receiving one or more values indicating the merging type and/or one or more merging parameters for a pixel and for encoding for said pixel said value or values in one or more least significant bits from one or more color components of the merged video signal.

A value indicating merging type may be considered a value indicating from which signals the pixel in the merged video signal is composed. For instance, it may indicate whether the pixel is pure video, pure overlay, a mix of video and overlay, or possibly also what type of overlay is present in the mixture. In some examples, at least one value encoded in one or more LSBs indicates the merging type of the pixel. In many embodiments such merging type information is sufficient to indicate the merging type of a pixel, for instance to be able to distinguish between pure video pixels and other pixels. In some examples at least one of the values indicates merging type.

The one or more merging parameters may provide information on the amount of merging of signals, e.g. it may indicate the contribution of the individual signals to the merged signal for that pixel. The amount of merging indicates for instance for pixels of mixed merging type whether it is for instance a 50%-50% mixture of video and overlay, or a 25%-75% mixture of overlay and video etc.

In some examples only merging parameters indicative of the mixing ratio may be used. For instance if 6 LSBs, 3 in a first color component and 3 in another color component, are used where the 3 LSBs in the first component indicate the percentage of video mixed in and the other 3 LSBs in the other component indicate the amount of overlay mixed in, then the combination of the two triplets LSBs provide information on both type and merging amount. If the 3 LSB in the first component are all zero, then the pixel is pure overlay, if the 3 LSBs in the second component are all zero, then the pixel is pure video. If both the LSBs in the first and second component are non-zero, then the pixel is of mixed type (a mixing/merging of video and overlay) and the amount of merging can be read from said LSBs.

A method for decoding comprises receiving a video signal, reading one or more of the least significant bits of one or more of the color components, generating from said least significant bits one or more values and subjecting the received video image signal to an adaptation prior to display, wherein the adaptation is dependent on the generated value or values.

The video decoder comprises an input for receiving a video signal, a reader for reading at least one or more least significant bits for one or more of color components of the video signal for a pixel and generating one or more values from the read least significant bits and an adapter for adapting the video, wherein the adapter is arranged for adapting a pixel value in dependence on the generated value or values.

In known method and systems, the display receiving the data from a VPS (Video processing system), such as a set top box or Blu-ray disc player, wherein the video signal has been merged with overlays, has no means to distinguish video information (which should preferably be boosted to fit the capabilities of the display) from overlays, such as subtitles, or from signals that are a mix of original video and overlays, which should typically be processed differently. A set top box and a Blu-ray disc player are examples of a video processing systems.

Often the VPS is a consumer-side device. The approach is not restricted to such at home devices. The VPS could be a remote, i.e. not at home, device or system.

For instance with on demand TV, the VPS could be a box at a TV station making some mix of a program+subtitles, or, maybe even an insertion/recoding from an intermediate (e.g.

a cable station adding interesting further text from a commercial company "buy this car"). Likewise with "on demand" TV, the user could for instance choose a subtitle language wherein the language subtitles are merged not at the end user (e.g. at the home), but at the source, i.e. the signal being sent to the home user is a merged signal. The VPS would then be a remote system. The approach is not restricted by the physical location of the merger or the algorithm by which video and overlays are merged, the important aspect is that they are merged. Also, the merging does not necessarily have to take place in a single device or method step, for instance, an intermediate adds interesting text ("buy this car") on one part of the screen, while the TV station provides subtitles at another part of the screen. In that case two merging actions have taken place, or equivalently a distributed multi step merging has been performed.

In known methods and devices, it is impossible to find out, from the video signal data coming from for instance a set-top, whether a pixel is part of an overlay or of the original video, let alone what detailed aspects of the mix like the original graphics color value, video pixel color, or mix percentage are. This may often be immediately apparent to a viewer, but not to the display. In the prior art US20140125696 the overlays are adapted prior to merging, but this requires inputs in the VPS which may not be available. Also, the VPS may not know the characteristics of the attached display, or may even remain ignorant of what color transformation should be applied to the video, and therefore lack essential information.

Subtitles and other overlays do not form part of the original HDR video and often do not need boosting, or at least not to the same amount as the video itself. The dynamic range adaptation parameters (and in a more general sense, any manipulation or change to the HDR video data to adapt the video data to the display, by whatever functional manipulation) often only apply to the underlying video, not for the areas that contain the graphics overlays. The dynamic range adaptation parameters may change at certain instances (e.g. when the scene is changing), while subtitles or a menu overlay may be fixed during the change.

In known methods and system, the display will (and in fact cannot do otherwise) process every pixel of the received merged video independent of whether a pixel forms part of an overlay or not. The merger and the merging process is, as seen from the decoder side, a black box. There is an output, and there may and may have been some signals merged, but whether this has happened and how is unknown and cannot become known.

This could for instance lead to overlays such as subtitles starting to fluctuate in intensity in tune with the dynamic boosting of nearby parts of the video such as bright lamps.

In the current approach the least significant bit or bits of a component of the video signal are used, and in a sense sacrificed, (although in some technical implementations some bits may still be available for per pixel coding further information in addition to the video pixel color data), to provide information on whether and, in many examples to which amount, a pixel is formed by or part of an overlay (such as a subtitle or a menu) and/or by the original video. This allows a display receiving the video signal generated by the method or device of the current approach to treat e.g. overlays or parts of the image that are a mix of the original video and overlays differently from parts of the image that do not comprise an overlay but only comprise the original video. At the decoder side, insight may be obtained on a pixel by pixel basis on the merging that has taken place in the merger.

In a low complexity arrangement, a single least significant bit of one component is filled with an indicative value.

A single bit may be 0 or 1. This allows the video to distinguish on a pixel by pixel basis which pixels belong to the original video and which pixels belong to an overlay or a mix of video and overlay. In this simple arrangement, the above problems of e.g. co-fluctuating of subtitles with lamps can be mitigated. The display is provided with information that allows it to distinguish an overlay, for instance subtitles, from video and to dynamically adapt the image rendition of the video, while keeping the subtitles for instance fixed or adapt them in a different manner to the video pixels.

In a simple embodiment, the dynamic range adaptation may be applied to pixels belonging to the original video, while no or a fixed dynamic range adaptation is applied to pixels belonging to an overlay.

A color component may be for instance one of the RGB components of the signal or, if the signal is in the YUV format, one of the YUV components, e.g. the luminance Y of the pixel.

In more detailed embodiments, more than one last significant bit is filled with an indication value.

This allows, for instance when 3 bits are used, distinguishing more than one state, for instance when overlays are partially transparent. For instance, when three states are possible (e.g. fully video, fully overlay and mixes of video and overlay) a varying degree of merging can be identified. Dynamic range adaptation may for instance be applied to pixels that are fully original video, no dynamic range adaptation being applied to pixels that are fully overlay, and varying degrees of dynamic range adaptation being applied to pixels that are part original video, part overlay, dependent on the ratio of video to overlay.

The sacrifice of the least significant bits typically has little or no effect on the image. Often it is no sacrifice at all since the LSBs do not comprise highly visible image information.

Even if sacrificing the least significant bits in some instances may theoretically reduce to some extent the rendition of very fine details, the number of bits used in most video signals (and especially in an HDR signal) is usually enough for the rendition of the image in such details that the loss of the least significant bits would not be visible.

Even where there would be a small negative influence, the positive effect of being able to better render the overlays far outweighs any negative effect.

The least significant bits (LSBs) to be used to convey the video/overlay information may be selected from the various components, while taking into account the bit depth of the original video.

Very often, the number of bits used per pixel for at least one color component on the interface (e.g. 16, or 12) is more than the number of bits in the original video (e.g. 12, or 10). In that case there may be no impact on the video quality at all, if only little information on the merging situation needs to be communicated. In many cases, one can simply use the additional bandwidth of the interface channel.

In many implementations not more than 8 bits, divided over the 3 or more components of a pixel are filled with data indicative of the contribution of an overlay to the pixel values. Sacrificing more than 8 bits would typically not greatly improve the positive effect while starting to have an increased negative effect on image rendition and as stated, if the number of bits used in the merged signal is more than the original video no bits need to be sacrificed at all. In some embodiments, 6 or 4 indication bits may also communicate most useful information. In some embodiments, the number of bits used in the merged signal may exceed the number of bits in the video signal. In the following, the acronym LSB will also be used for "least significant bit".

In some embodiments, the number of LSBs indicating a merging type and/or one or more merging parameters in the merged video signal may be variable, for instance dependent on the merging type.

For simple merging types, for instance "only video", less LSBs are needed for transferring information to the decoder. Using less LSBs for merging type and merging parameter information provides more bits for transfer of video pixel color information.

A coding length signal may be provided so that at the decoding side the length of coding can be known. The variable length coding can be provided by the merging type indication.

Information on the encoding of the data indicative of the merging property (e.g. which constituents have been merged, wherein "constituents" may be video, and one or more overlays) may be provided in LSBs separate from LSBs that provide information on the amount of merging, e.g. the transparency of overlays or a mixing proportion.

This allows the information on the encoding to be written and read prior to more detailed information on the merging. This allows the use of less LSBs for information transfer thus leaving more bits for other information, for instance luminance information.

In some embodiments information is supplied to or in the signal, for instance in the form of metadata or flags, indicating which the encoding of the values being indicative of the merging property. E.g. it may indicate the LSB or LSBs that are used for providing information on the merging, such as which signals were merged and or how they were merged, and how they can be read.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept.

DETAILED DESCRIPTION OF THE DRAWINGS

Figure 1:
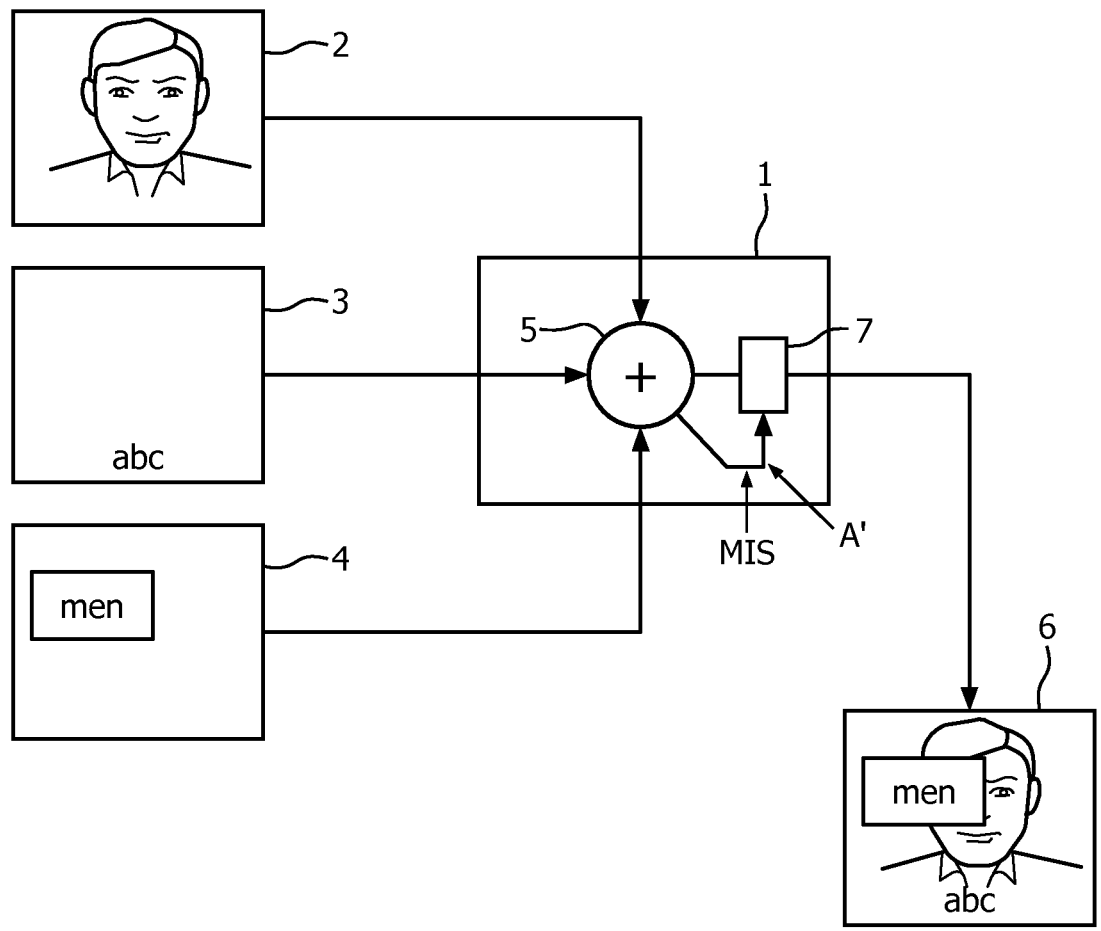
FIG. 1 illustrates an example of a merging of video signals.

In FIG. 1 an example of an aspect of an exemplary embodiment of the invention relating to the encoding side is illustrated.

In a Video processing system or video processor (VPS) 1, an input video image signal 2 for the original video is merged with overlays 3 and 4 in merger 5 of the VPS 1 to provide a merged video signal 6, comprising a merging of the original video and the overlays. The merger 5 provides information to encoder part 7.

The input video image signal 2 is an HDR image signal in the sense that it provides a representation of an HDR signal. The input video image signal 2 may in itself be an image that is intended to be presented on an HDR display, i.e. the color grading/tone mapping may be adapted to be directly rendered on a display with a maximum brightness no less than typically 500 (or 1000) nits. In other embodiments, the input video image signal 2 may provide an image representation that is intended to directly be displayed on an LDR display, i.e. with on a display with a maximum brightness below (typically) 500 nits, but which has a direct (known) mapping or translation to an HDR image intended for display on an HDR display. Thus, the input video image signal 2 may be an LDR image representation mapped from an HDR image representation of an image using an HDR-to-LDR mapping. Such a message is still an HDR image as the original HDR image can be regenerated by applying the inverse mapping (which may further be included in the HDR image).

Similarly, the overlays may be provided as HDR representations or may be LDR representations that can be combined with the HDR or LDR representation of the HDR image signal.

The merged video signal 6 is similarly an HDR image signal and indeed with the input signal being a (direct or indirect) HDR image signal, a simple merging of the overlay values with the input values will result in the merged video signal 6 corresponding to the input video image signal 2. In the example of FIG. 1 the original input video image signal 2 is merged with subtitling signal 3 and/or a menu signal 4 (e.g. a menu of the VPS used to control operation, such as e.g. a menu from which one can select the source video, or change the sound volume, or a menu from the BD disk showing available options how to play the disk, etc.). The VPS comprises an encoder 7 for encoding the merged video signal 6. To the encoder 7, via merging information signal MIS, merging information is provided by merger 5 on the merge (e.g. whether a pixel is video or overlay and to what extent) for pixels. The merging information provides information on a merging property indicative of a property of the adding of the one or more overlay signals 3, 4 to the input video image signal 2 for that pixel. The merging property may specifically be indicative of the source of the pixel in the merged video signal 6 (i.e. from which signals the pixel in the merged video signal is composed) and/or of the amount of merging of signals. The merging information can for instance be an indication of the fact that signals are merged, e.g. "this pixel is video plus subtitle" and/or be transparency data for the different components of merged signals, for instance it may be an indication that a merged subtitle has a transparency of, say, 50% or 25%.

FIG. 1 shows two possible types of overlays, subtitling 3 and/or menu 4 being merged with the video in merger 5. Other types of overlays may of course be used in other embodiments, such as for instance PIP (picture in picture), a logo, or advertisement overlays etc. Such overlays may additionally or alternatively be merged with the video in merger 5. The skilled person will understand that embodiments of the described methods/apparatuses can be used in various scenarios where there is only one simple kind of special pixels, e.g. simple subtitles of only few possible opaque colors, or can be used in more complex systems, where various types of graphics or video mix may be present at the same time. In such examples, the different types may e.g. be discriminated by the here below described situation characterizing codifications.

After the merging operation, the individual pixels can in many embodiments be one of several merging types. For example, it can be a pure type which comprises contributions from only one source, for instance it can be a pure video or pure overlay (wherein the type of overlay may also be important, i.e. different types of overlay may result in different merging types). The individuals pixels can alternatively be of a mixed or merged type wherein the pixel is made up from contributions of more than one source, for instance 50% video and 50% subtitles. The weight may for example be determined by the transparency of the subtitle that is merged with the video.

Figure 2:
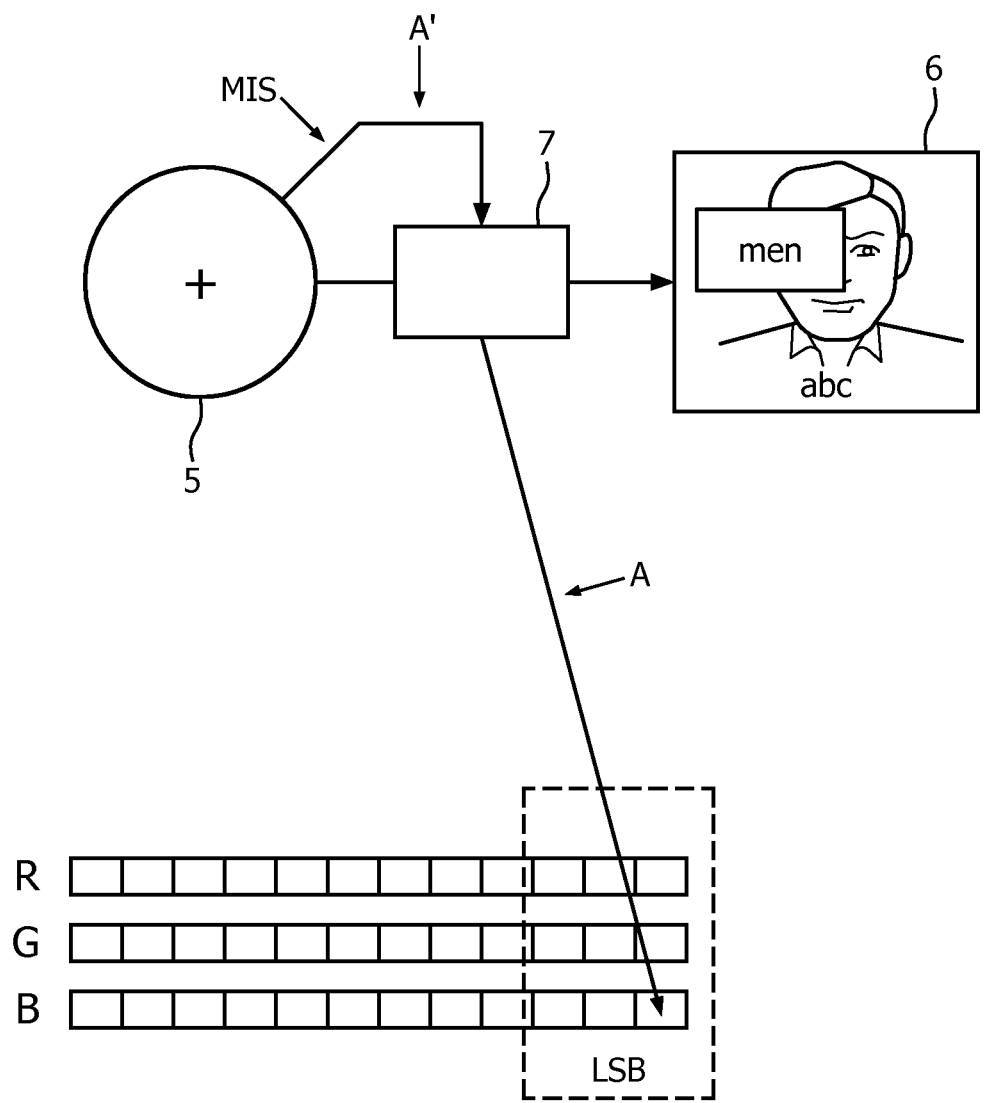
FIG. 2 illustrates an example of a video processing system in accordance with some embodiments of the invention.

FIG. 2 illustrates the encoding performed by the encoder 7. The encoder 7 is provided the merging information A' via signal MIS where the merging information is indicative of merging property which reflects a property of the merging in merger 5. The encoder generates a value A for (typically) each pixel indicating, for a given pixel in the merged video signal, a merging property indicative of a property of the merging of one or more overlay signals 3, 4 to the input video image signal 2 for that pixel. The value A for a pixel may specifically be indicative of the merging type and/or one or more merging parameters for that pixel as determined from the received information A'.

In some embodiments, the merger 5 may directly provide the value A to the encoder 7 in which case A'=A. In other embodiments, the encoder 7 may generate a different value A to encode from a received value A'.

In the specific low complexity example of FIG. 2, each pixel of the merged image is indicated to be either video or to be a subtitle or menu. Thus, each pixel is indicated to be one of two possible merging types.

The encoder 7 fills one (or more) of the least significant bits of one of the components of the HDR signals with the value A it has generated on basis of the information provided by the merger or which it has received directly from the merger 5.

In the example of FIG. 2, the merged video signal 6 is an three color component video signal and is encoded as such. Specifically, it uses three color components R, G and B which in the specific example are indicated as each having 12 bits, i.e. each color component value is represented by 12 bits. In FIG. 2, the filling is specifically depicted as being performed in a separate encoder 7, but a person skilled in the art will appreciate that this may be performed by other functional units, and that in particular the encoder can form a part of the merger 5, which may in some embodiments perform the two functions simultaneously.

In the example, each pixel can only be either video or it can be subtitle or menu, so it suffices to use for the value A, a simple binary representation of 0 or 1, where 0 may denote that the pixel is pure (unaffected) video and 1 denotes that the pixel represents a subtitle or menu (or e.g. that it represents any special graphics object). This can be represented by a single bit and thus for that pixel the value may be provided in one of the LSBs. In the example, the blue channel is used, because human vision is less sensitive to that information, and therefore the perceptual impact of the introducing of a small error in the LSB is reduced. In other embodiments, other color channels may be used. For example, for a YUV encoding, we could e.g. use one of the U or V components mutatis mutandis.

In many embodiments, such as that illustrated in FIG. 2, there is an alternative route for determining the information on the merging and specifically for finding the value A. Instead of the merger 5 directly providing the signal MIS with merging information A' to encoder 7, a comparator may be used for comparing one or more of the signals 2, 3 and/or 4 prior to merging with the merged signal 6. Thus, the merging property may be determined in response to a comparison of the merged video signal 6 to one or more of the input signals to the merger 7. For instance, if for a pixel, the input video image signal 2 is compared to the merged video signal 6 and the two signals are found to be the same, then it can be assumed that said pixel is pure video and no merging has taken place of the input image signal with an overlay. The value of A for said pixel may then be set to e.g. 0 indicating "pixel is pure video". If the input video signal 2 and the merged video signal 6 differ, then merging has taken place. The value for A for said pixel may then be set to e.g. 1, indicating "pixel is of mixed type". Such a comparison scheme provides information on merging that is not coming from the merger 5 directly but by comparison of signals prior to and after merging. Such a comparison can be made in a comparator that may be part of or coupled to the merger 5 or the encoder 6. More complex comparisons may also be made. Of course any combination of these two possibilities may also be used. For instance the merger 5 may in the signal MIS provide a coarse indication (e.g. indicating whether the pixel represents pure video (i.e. the input video image signal 2 without any contribution from an overlay) or not) and if that indication shows "not pure video" then a comparison is performed between one or more of incoming signals and the merged signal to determine more details on the merging. The determined merging information is then encoded on a pixel per pixel basis in one or more LSBs.

Figure 3:
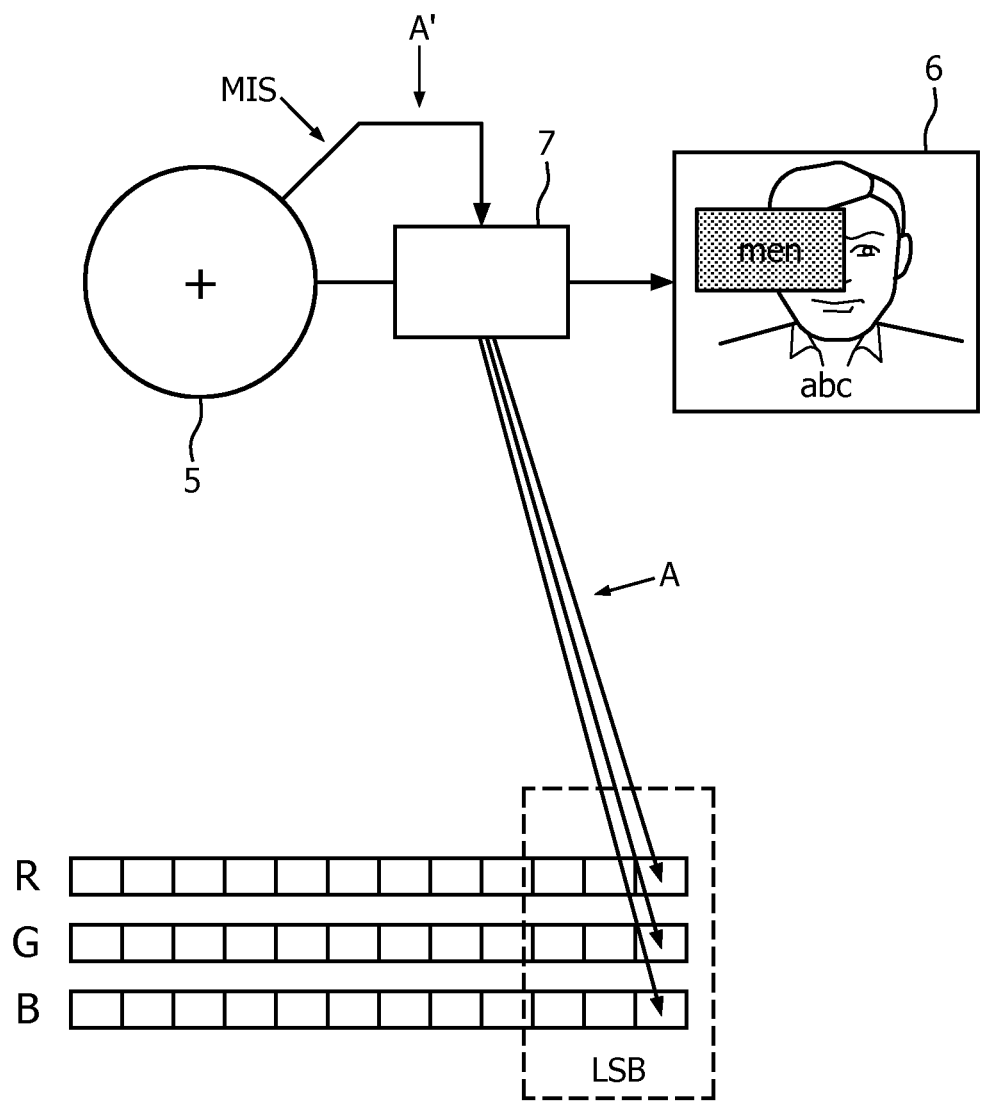
FIG. 3 illustrates an example of a video processing system in accordance with some embodiments of the invention.

In a somewhat more complex embodiment, the type of overlay may also be encoded, e.g. it may be encoded whether the overlay is a subtitle or a menu. In such a case, more than two merging types are possible and more than one LSB is used for encoding the merging type. Thus, in such an example, the value A may take more than two values and accordingly it is represented by more than a single bit, and thus communicated in a plurality of LSBs. FIG. 3 illustrates such an example where in each color component, the least significant bit is used. This provides three information bits which can signal maximally eight merging types (e.g. eight types of overlay with one indicating that there is no overlay) (2 to the power 3, because in this merely elucidating example we have used the lowest bit from each channel for situation coding). The skilled person can understand from this how we could use N bits from the first color component, M from the second, and O from the third, according to what is technically preferred for the system given the required quality of the video and graphics look on the one hand, and the desired amount of situation codification for a typical receiver color transformation (and situation reconstruction) functionality on the other. Thus, the exact number of LSBs used in different color channels will depend on the preferences and requirements of the individual embodiments.

Figure 4:
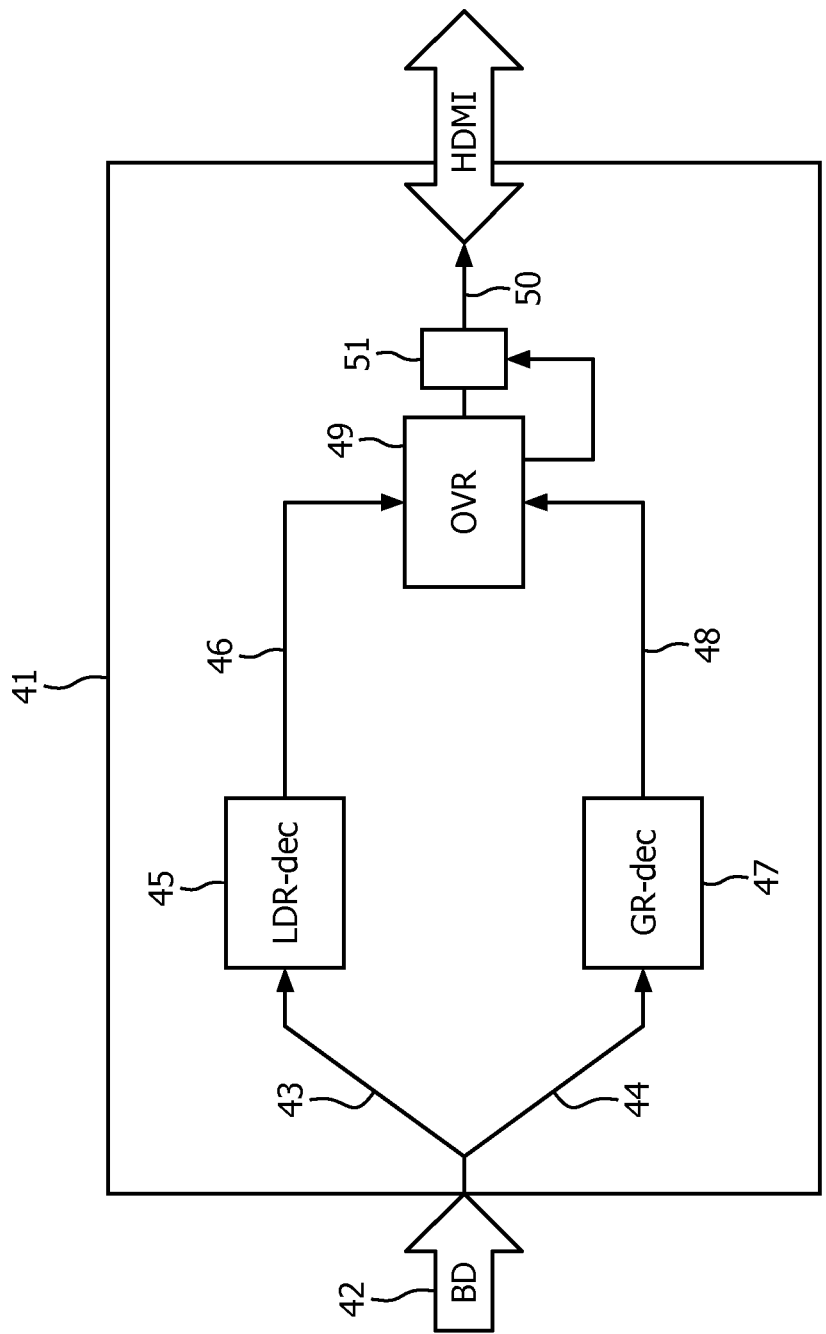
FIGS. 4 to 7 illustrate examples of some embodiments of an encoding in a video processing system in accordance with some embodiments of the invention.
Figure 5:
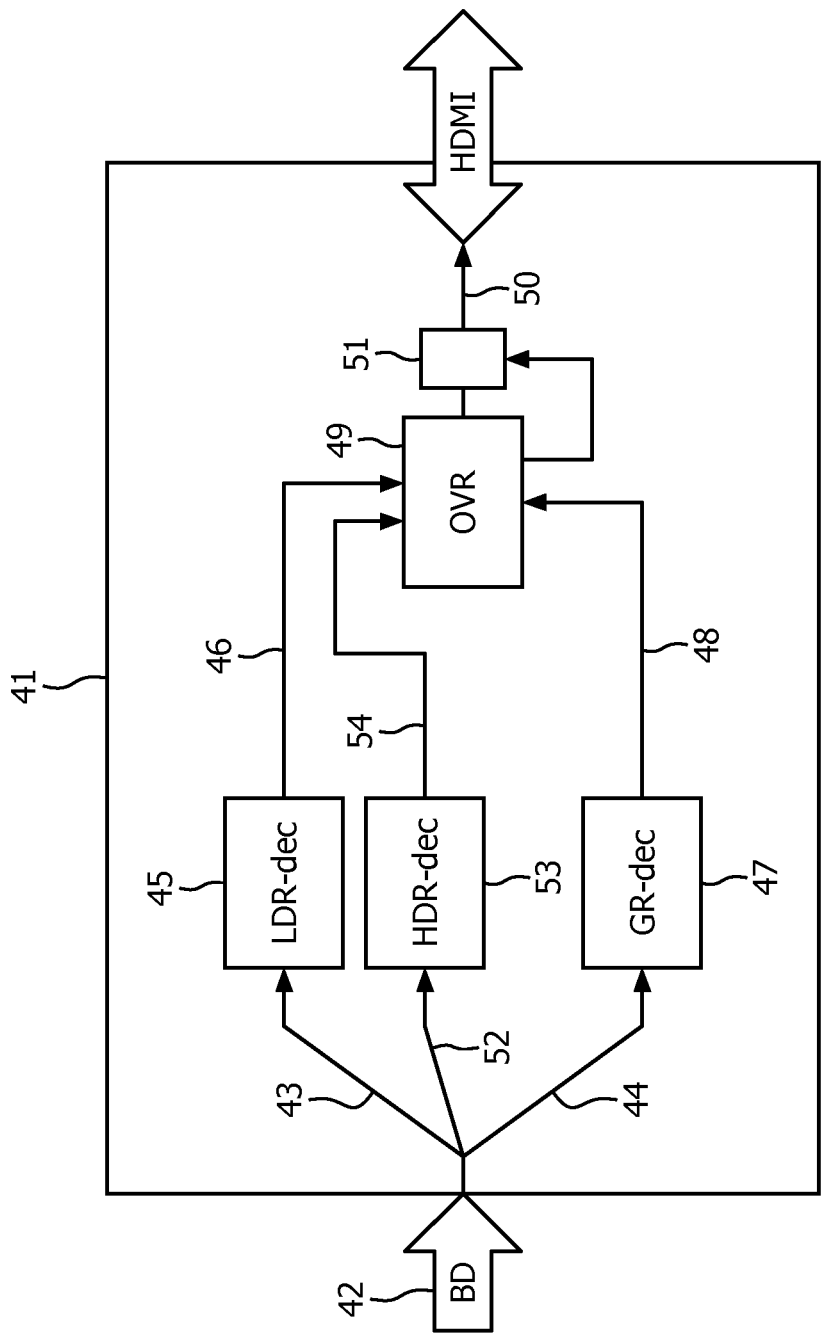
Figure 6:
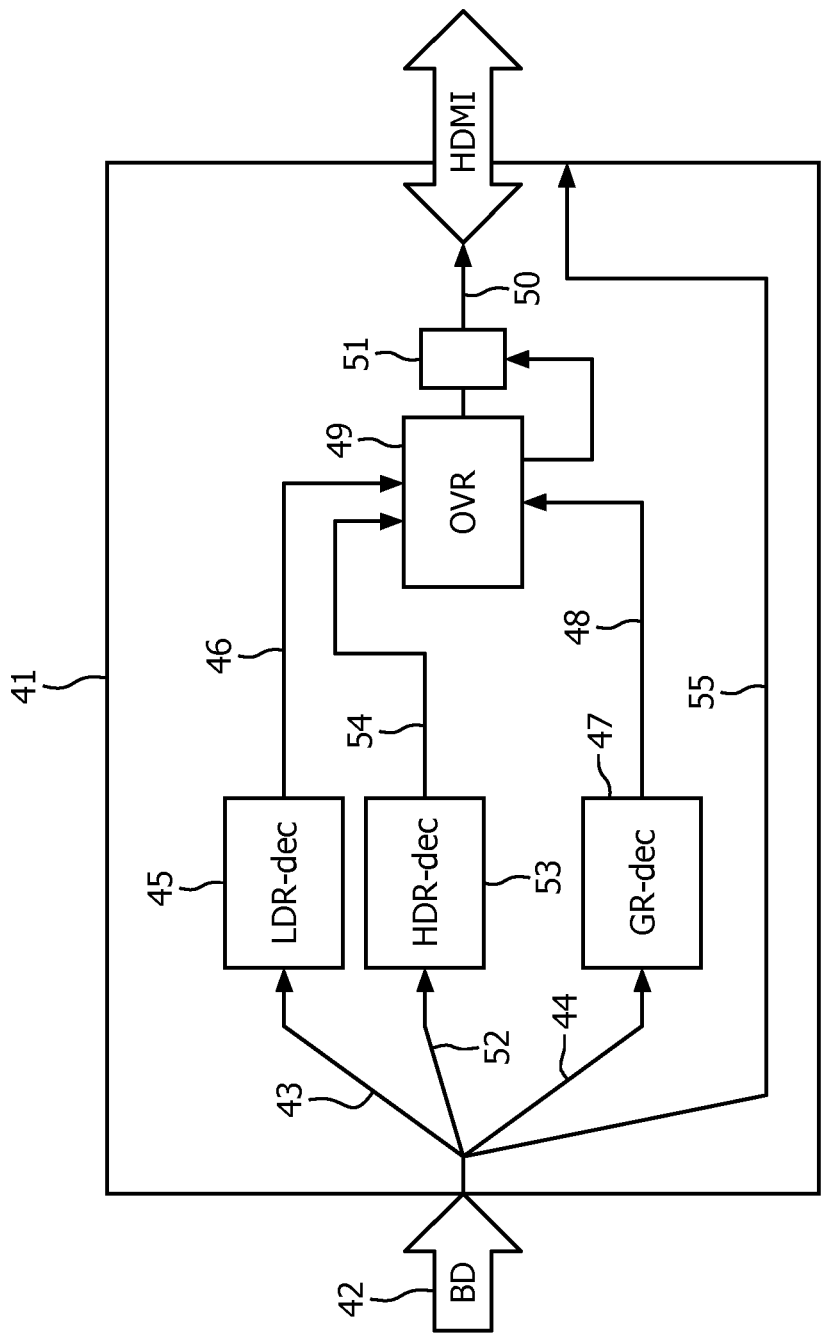

FIGS. 4 to 6 show further embodiments of video processing controlled for an input stream of video information.

FIG. 4 shows an embodiment with only LDR video data representing an HDR image being provided. In this example, the LDR image data 43 is graded to be directly shown on an LDR display. For example, the source of the image data may have optimized the dynamic range for a, say, 100 nits display, and thus if the image is presented on an LDR display (with a maximum brightness of 100 nits), it can be rendered directly without any dynamic range adaptation or further color grading. However, the LDR image data still provides a representation of an HDR image as the data allows a direct generation of an original HDR image by applying a dynamic range mapping. Thus, by knowing the dynamic range mapping, the receiving end can re-generate the original HDR image.

Specifically, at the transmitting or source end, an HDR image may be subjected to a color (specifically luminance) grading to generate an output image suitable or optimized for presentation on an LDR display. This grading may provide a dynamic range mapping or function which specifically may be a homogenous one to one (reversible) function, e.g. directly relating an input luminance to an output luminance. As a result, an output image is generated which may be presented directly on an LDR display. However, the LDR image data still represents the HDR image, and specifically provides a representation of the HDR image from which the original HDR can be generated by applying the reverse dynamic range mapping or function. Thus, even if the image is represented by image data that allows direct presentation on an LDR display, it still provides a representation of the HDR image (e.g., it can be considered as a specific encoding of the HDR image). Thus, in contrast with conventional approaches where only LDR images are considered and wherein received LDR image data is derived from (and represents) an LDR image, the LDR image data of the example is actually a (n LDR) representation of an HDR image. Thus, in the example, the received LDR image data is linked to or associated with an original HDR image. Specifically, in the example, HDR images for HDR displays can be derived by boosting the LDR images to provide HDR representations.

The video processing system of FIG. 4 will in the following be considered a BD (Bluray Disc) player 41 but it will be appreciated that it may be other devices in other embodiments. The BD player 41 receives an input stream of video information, e.g. a BD data stream 42. The stream comprises both LDR video data 43 and graphics data 44 for generating graphics (or alternatively or additionally graphics data could come from another place, e.g. it could be graphics generated in the player itself, or received over a network connection such as the Internet, etc.).

The LDR video data 43 (representing an HDR image) is processed in LDR-decoder LDR-dec 45 providing a decoded signal 46 (e.g. linear RGB colors per pixel, derived from DCT transformed data according to an MPEG or similar video encoding standard which was used for storage). The graphics data 44 are processed in graphic decoder GR-dec 47 and constitutes an overlay 48 that is used in overlay processor OVR 49 to overlay the video signal to generate the merged image display signal 50, e.g. an HDMI signal, i.e. a signal to be sent over an HDMI interface (or any other video signal communication system). This overlay processor merges the video with one or more overlays such as subtitles or menus and is therefore also called a merger within the framework of the invention. The OVR reacts for instance to a signal sent by a remote controller with which the viewer can choose e.g. whether or not to use subtitles and if so, in which language, and or to start a menu etc. The HDMI signal 50 is the merged signal that is to be received by a display device and which results in an image being displayed on the display of the display device, wherein the image displayed on the display may have subtitles and/or menu parts. In the encoder 51 one or more of the least significant bits of the merged signal are filled with merging information such as specifically information on whether and/or to what extent, the individual pixel is representing video or overlay. The information in the respective LSB can be read at the decoder side and thus informs the decoder of e.g. the merging type of the merged pixel, (e.g. what the constituents of the pixel are, i.e. which signals were merged, or indeed if signals were merged), and/or e.g. merging parameters (e.g. indicating the merging ratio between the merged signals). In other words, the information in the LSBs may be values indicating what was merged, (e.g. merging type information, and/or how the input signals were merged (e.g. the amount of merging for, for instance, pixels that are mixed or merged type pixels). As explained above, such information can be based on information provided by the merger 49 and/or by comparing signals before and after merging.

FIG. 5 shows an example of a video processing which is controlled by graphics processing control data and a display mode for an input stream of video information which includes both LDR and HDR video data. The system is similar to that of FIG. 4. However, an additional feature is that the BD data stream 42 has both LDR video data 43 aimed at direct presentation on an LDR display as well as HDR video data 52 representing additional HDR data. The HDR video data 52 may for example provide information on the mapping used to generate the LDR image data from the original HDR image, e.g. by directly providing the dynamic range mapping or the inverse dynamic range mapping function. In other embodiments, the HDR data may directly provide a full or partial HDR representation of the original HDR image (or a different HDR representation of the original HDR image (e.g. related to a different maximum brightness level). Indeed, in some embodiments, the input video image signal 2 may be considered to be an HDR video image signal by virtue of the HDR image data with the LDR image data potentially not being a representation of an HDR image.

The HDR video data 52 may in some embodiments specifically define e.g. only the color mapping functions to transform the LDR representation on the disk to a HDR representation. However, in other embodiments, the data could directly be HDR images in a dual-image encoding system, or parts of images (e.g. provided only for high brightness regions of the LDR images, etc.). The video processing system includes an HDR decoder HDR-dec 54 for decoding the HDR signal. In some embodiments, either or both of the decoders may be used e.g. dependent on whether an LDR or a HDR image is to be sent over the HDMI interface. Alternatively, in some embodiments or scenarios, the signal may only comprise an HDR signal.

In both FIGS. 4 and 5, the graphic data (information on the overlays) are part of the incoming signal. It will be appreciated that it is in many embodiments possible that the graphic data is generated within the VPS. In the sysem, the video signal and one or more overlays are merged and this is not limited to graphics data or overlays being provided in any specific form or from any specific source. The merging provides for a signal wherein the video and the one or more overlays are merged thereby providing for at least some pixels a merged pixel value.

The merged pixel values themselves do not directly provide information on what was merged or how the merging was performed (i.e. the amount of merging for each pixel).

In some embodiments, the merging may be a selection merging for each pixel. Thus, for each pixel, the pixel value of one of the input signals, i.e. of either the input video data or of one of the overlays, is selected for each pixel. For example, for a subtitle region, the merger may select the output pixel values as the pixel values of the subtitle overlay input. However, outside the subtitle region, the merger may select the pixel values of the input video image. Thus, a merged image is generated comprising the subtitle overlay pixel values in the subtitle regions and the image pixel values in the remaining parts of the image. In other embodiments, pixel values may e.g. be generated by combining pixel values from the input image and one or more of the overlays. For example, a weighted summation may be made between the pixel values of the input image and pixel values for the subtitle overlay. The weight for the subtitle overlay pixel values may e.g. reflect a transparency level of the subtitle.

It will be appreciated that the overlay information need not be provided as full or partial images comprising a set of pixel values but may be provided in any suitable form, such as e.g. as a set of letters from which pixel values can be determined based on a stored graphical representation of each letter.

Seen from the output, conventional devices providing a merging of overlay and video are black box devices, which provide an output, but what has happened inside the device cannot be deduced from the output. However, in the described examples, one or more least significant bits are occupied by information on the merging that has been performed and thus it provides a low complexity manner of providing an insight into the process that was performed in the merger. In other words, from the point of view of a decoder, the device/merger no longer forms a black box, but rather insight is provided into the merging operation.

This allows the decoder side to perform adaptations that are more tuned to the actual merging characteristics of the merged signal, i.e. what was merged and/or how on a pixel by pixel basis. In particular, it allows the decoder to perform dynamic range adaptation which can be optimized for the individual characteristics, and specifically the nature, of the individual image objects.

FIG. 6 shows another exemplary embodiment. The example corresponds to that described with respect to FIGS. 4 and 5 but with the further additional feature that the BD signal 42 also comprises information 55 for an HDR display on how to dynamically adapt the signal 50. Thus, specific information on dynamic range adaptation may be included. This information may e.g. be in the form of metadata provided with the video signal, where the metadata may encode e.g. luminance boosting functions for changing the luminances of pixel colors of e.g. the LDR image. As another example, it may encode a dynamic range mapping which maps from an HDR image to an LDR image. Such an approach may be suitable for a scenario where the HDMI images are HDR images and may allow the signal to be presented on an LDR display by this mapping the HDMI image to a suitable LDR representation. The video processing system may then pass this information on to the display.

Figure 7:
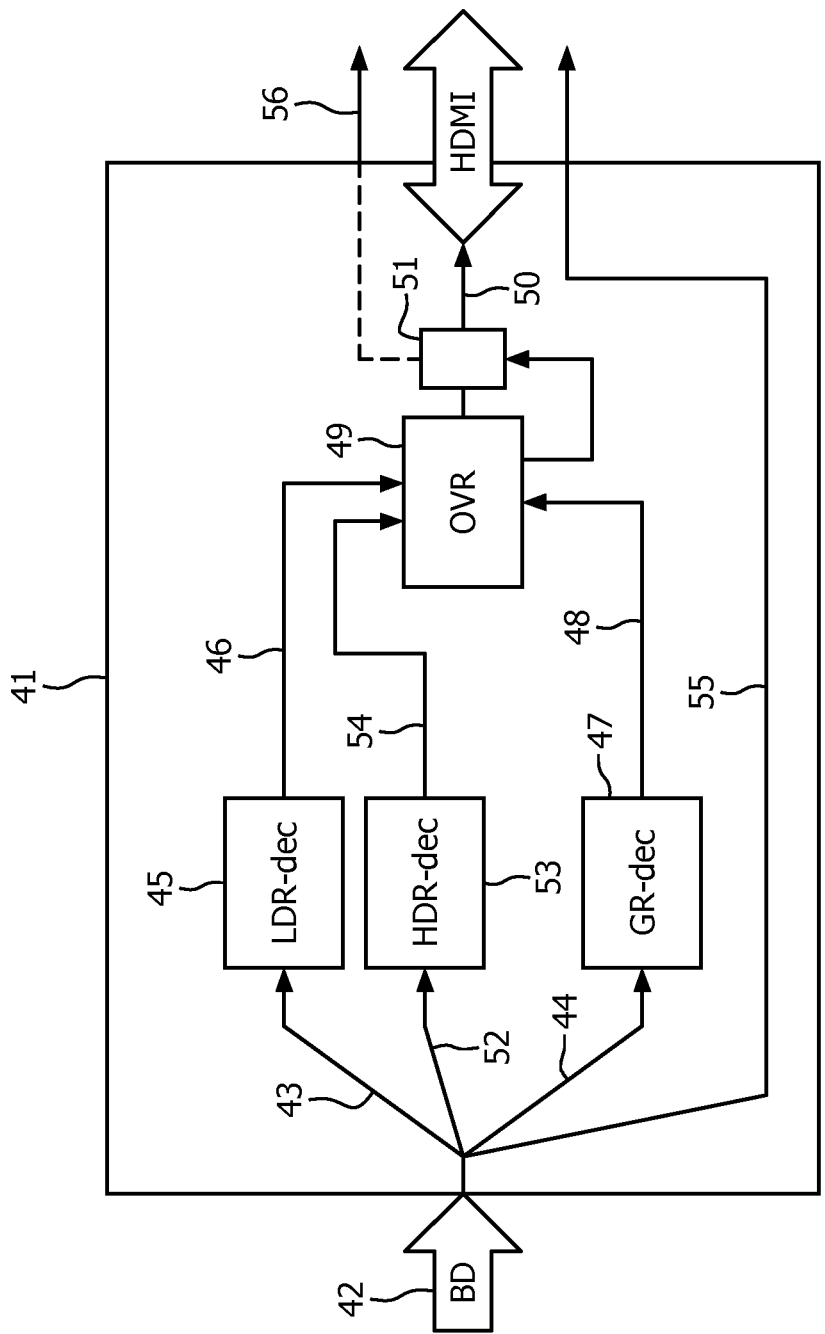

FIG. 7 illustrates yet a further exemplary embodiment. In this example the video processing system 41 further generates a signal 56 which comprises information on which least significant bits are used and what kind of information can be obtained from these bits. Thus, in the example, data is provided which describes how the merging information is encoded in the merged video signal.

It may be advantageous to communicate e.g. at the beginning of a video (e.g. a movie, commercial, YouTube video, etc.) which system of encoding is used for providing the merging information. The same e.g. three LSBs can then in various scenarios be used to encode different aspects (e.g. if only simple subtitles are used, a simple mixing scheme may be communicated indicating whether individual pixels are subtitle or image pixels. If e.g. complex graphics in a menu rectangle is employed, the encoding may possibly reflect properties of the menu background etc.) The skilled person will understand that dynamic schemes may be used. E.g. at the beginning of a movie the codification/encoding scheme for BD disk menus may be communicated, but if the user during the movie accesses apparatus menus, a different codification/encoding scheme may be communicated, which is more appropriate for the apparatus menus. For a given time (or e.g. until other information is provided) this new encoding scheme may be used. The signal 56 may also provide changing information for instance in some proprietary video a "1" in the least significant bit may mean "opaque subtitle", but at the beginning of said video signal (or e.g. half way through the video) the signal 56 may indicate that the "merging type-1" indication means something else, for that video, or from that point on in the video it may mean e.g. transparent mix, or box-background of a graphic or etc. In short, signal 56 may provide information on which bits are used for providing merging information and/or on how the bits are used for providing this merging information. It may specifically provide information on how the information may change in time, e.g. from scene to scene or from video to video.

A specific example of a use of overlays will now be described.

In this example, a menu to be added to an image is partially transparent so that the image may be partly seen through the menu (the image "shines" through the menu). In accordance with some embodiments supporting such a menu, the encoder 7 may encode a value A representing the transparency of the menu or of the mix of menu and video in a number of LSBs, and in the specific example in the three LSBs. The amount of merging per pixel can then be indicated in Value A encoded in the three LSBs.

An example in which 3 bits are used is e.g.:

|  | Video | graphics |
|---|---|---|
| 000 | 100% | 0% |
| 001 | 75% | 25% |
| 010 | 50% | 50% |
| 011 | 25% | 75% |
| 100 | 0% | 100% |
| 101 |  | reserved |
| 110 |  | reserved |
| 111 |  | reserved | where the term "graphic" refers to the overlay, for instance a subtitle, menu etc.

This is an example of an embodiment where only LSBs are used to indicate merging parameters indicative of a degree or level of merging, with specifically bit values 000 to 100 reflecting the amount of mixture of video and overlay.

In the examples described so far R, G and B color components have been referred to.

However, the video information may also be in other formats, such as for instance an YUV format, or an RGBE format, or formats where layers are used or where four colors are used ets. In the different formats, digital representation of the values provides for components wherein the values are expressed in a number of bits, and for HDR the number of bits is typically relatively large (typically 12 or more). Thus, the binary representations of the values includes a number of bits of which the least significant bit(s) are referred to as LSB(s).

In many embodiments, the LSBs that have the least visible effect are used for encoding of the merging information. As mentioned previously, the encoding in many embodiments may indicate not just whether an overlay is present or not, but also which type of overlay and/or e.g. the transparency of the overlay.

Which of the LSBs that are used for encoding may be predetermined and may e.g. be a standard. In such a case the decoder will know how the merging data is encoded and no additional information needs to be added to the video signal. In some embodiments, there may be more than one possible way of encoding merging information in the LSBs and the BD player/VPS may add information on the applied encoding. For instance, metadata or a flag may be included detailing which LSBs are used for encoding which information.

At the decoding side this information can then be read and the relevant LSBs can be decoded accordingly.

If there are a number of encoding methods, e.g. from simple to more complex, and the encoder has the possibility to dynamically switch methods, e.g. from pixel to pixel, from frame to frame, or from scene to scene. to get the best possible result, the type of method used may e.g. be dynamically indicated as a value in one or more of the LSBs, as metadata or flag. One option would be to use the LSBs of pixels e.g. from the left of the top line of the video. The perceptual impact of this is likely to be acceptable and indeed in many embodiments would be insignificant.

Figure 8:
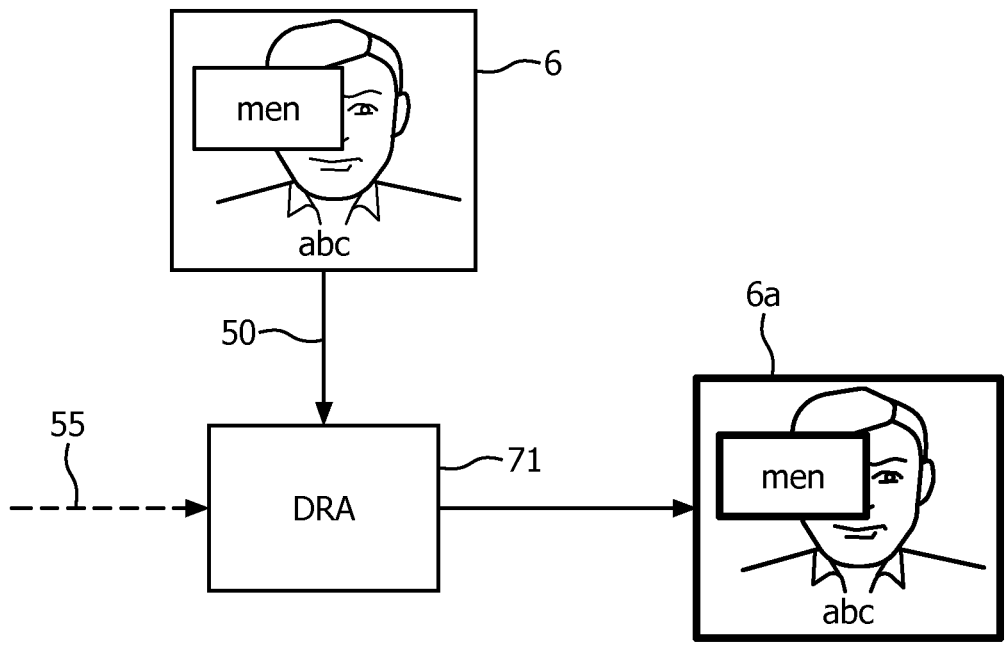
FIG. 8 schematically illustrates a problem of prior art methods and systems.

FIG. 8 illustrates an example of how a prior art decoder or video display driver may process a merged video signal. The merged video signal may be a conventional merged video signal or may be a merged video signal provided by a video processing system as previously described. Thus, it may be the previously described merged video signal 6 which comprises merging information in LSBs. In the prior art video decoder processor of FIG. 8, this merging property information will simply be ignored. The example also illustrates that there is backward compatibility for the described approach.

In the example, the merged image 6 is to be displayed on an HDR display and the video encoder includes a dynamic range adaptation to modify the dynamic range to be suitable for an HDR display. However, in the example, the decoder at the display has no functionality for reading the LSBs and it cannot generate any merging information or specifically the value A. This may result in the following scenario.

An HDR image is an image which encodes the textures of a HDR scene (which may typically contain both very bright and dark regions) with sufficient information for high quality encoding of the color textures of the various captured objects in the scene, such that a visually good quality rendering of the HDR scene can be done on a HDR display with high peak brightness, like e.g. 5000 nit. A typical HDR image comprises brightly colored parts or parts strongly illuminated compared to the average illumination. Especially for night scenes HDR becomes more and more important. The display receiving the HDR signal tries to improve the video signal to match its own characteristics, including e.g. peak brightness level. To do so dynamic range adaptation is performed. E.g. if the DR of the display is somewhat lower than that of the encoded HDR images (i.e. the corresponding reference display DR which is optimal for rendering the images) the processing may non-linearly downgrade the luminances, e.g. mostly lower the luminances of the brightest objects while keeping those of the darker objects constant, and vice versa if the display is brighter (e.g. a 5000 nit image to be optimized for a 10000 peak brightness nit display). The skilled person will understand that similarly e.g. an HDR image for a 3000 nit display can be calculated from a 100 nit graded input image as starting image.

If the receiver/display has no knowledge about the characteristics of the video signal and/or the grading that was applied, the resulting picture might not be in line with the artistic intent or might simply look bad. Therefore, preferably dynamic range adaptation parameters/instructions, such as for instance via signal 55 as shown in FIG. 7, may be and preferably are included with the video or conveyed otherwise to the display to provide processing information for optimizing the picture quality for the peak brightness level and other characteristics of the display on which the signal is displayed. The dynamic range adaptation parameters/instructions may be static, i.e. be valid for a whole program, or dynamic, i.e. change from frame to frame or (typically) from scene to scene. The adaptation parameters may operate on the whole picture area or may be constrained to certain areas of the picture.

By whatever method dynamic range adaptation is performed, in prior art methods and systems the dynamic range adaptation is performed on every pixel in the same manner, i.e. ignoring that some pixels are of a different type, like a mix with graphics. The adaptation would then be valid only for one type of pixel, namely typically the video only pixels.

In FIG. 8 this effect is simulated by a thickening of the lines and text.

Of course, this is not a real to life representation, but is meant as an illustration. The image 6 is subjected to a dynamic range adaptation DRA in dynamic range adapter 71 for providing an adapted image 6a, and the adapted image 6a is displayed on the display of an HDR display device. In and by itself there is no problem in displaying the adapted image, the data are in the form of standard data and can be adapted and then displayed. In FIG. 8 one or more of the LSBs of the components of the signal are filled with information on the overlays. The exemplary decoder in FIG. 8, however, being assumed to be a standard decoder, cannot read said information.

In the example of FIG. 8, the received video data is used directly without considering the merging information contained in the LSBs (or indeed without the video decoder having any knowledge of this information being encoded in the LSBs). The least significant bits are typically of no or little significance so the display will tend to provide a "normal image" when this is rendered. In other words, by using the LSBs for communicating the information, the degradation or error resulting from the inclusion of merging is likely to be insignificant in many embodiments and scenarios.

For instance when RGB 444 is used on the HDMI interface with 14 bits per component and with a color component video resolution of 12 bits, there are normally six bits (3×2) "superfluous" or unused bits for each pixel. Thus six (namely 14−12=2 bits per component times three components) bits are in total available for the merging information signal without this introducing any error or having any impact on the encoded pixel values. In short, the method of encoding the merging information may in many embodiments be achieved while maintaining a system that is backwards compatible. If more bits are available in the interface than needed for the original video the introduction of merging property data can be achieved without any negative effect as otherwise unused bits can be utilized. This may provide backwards compatibility while allowing a new decoder to make use of the additional merging information to e.g. improve the rendering of the e.g. subtitles (as will be described later).

Figure 9:
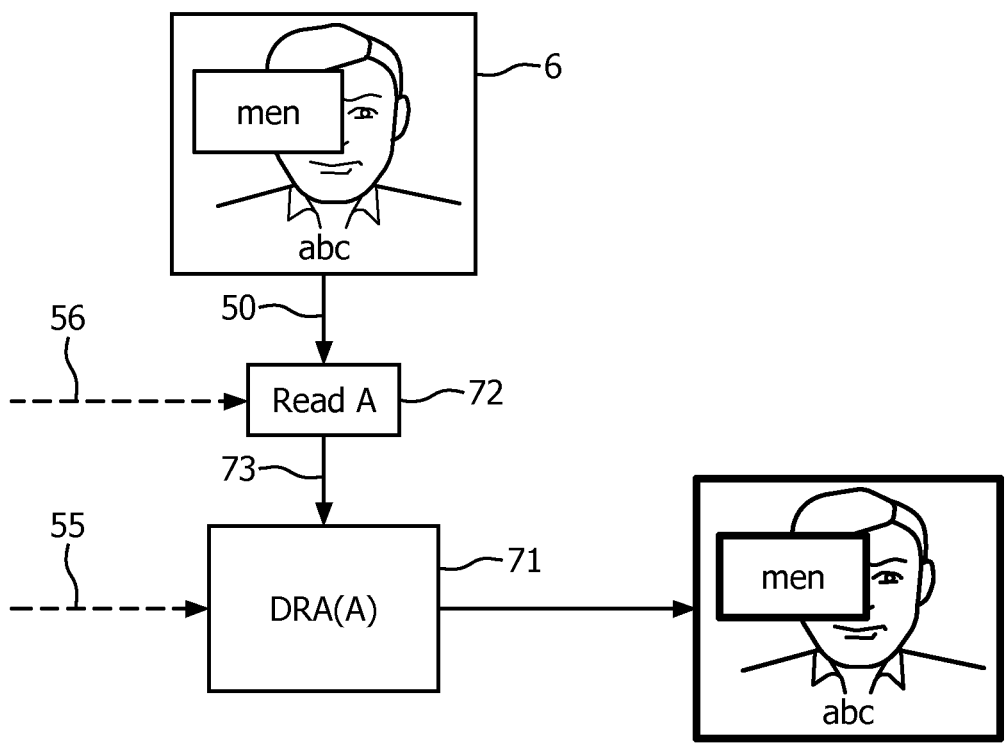
FIG. 9 illustrates examples of merging video and overlays.

As described, the overlay (specifically subtitles and/or a menu) will in the prior art approach of FIG. 9 be subjected to one and the same dynamic range adaptation DRA as the video image itself. Thus, all parts are treated equally. There is no other way of doing so in known methods and devices. In FIG. 8, this is indicated by having all lines and text thickened evenly.

However, the subtitles may due to the dynamic range adaptation be different from the type of subtitles that viewers are used to. In practice, subtitles tend to often become too bright and/or may start oscillating in brightness when processed as in the system of FIG. 8.

FIG. 9 illustrates an example of an apparatus for processing a merged video signal in accordance with some embodiments of the invention. The apparatus may specifically be a display driver, video decoder, or indeed a display. In the following, the apparatus will be described as a video decoder but it will be appreciated that the apparatus is not limited to only decode a received image stream. Rather, the apparatus may also perform dynamic range adaptation which specifically may provide an adaptation from an input luminance range to an output luminance range. Specifically, the dynamic range adaptation may adapt a received image from a dynamic range corresponding to a first maximum brightness or white level (e.g. given in nits) to a dynamic range corresponding to a second maximum brightness or white level (e.g. given in nits).

The dynamic range adaptation may for example be from image data referenced to an LDR dynamic range to image data referenced to an HDR dynamic range. Thus, the dynamic range adaptation may be from an LDR range to an HDR range. In other embodiments, the dynamic range adaptation may from an HDR range to an LDR range. In yet other embodiments, the dynamic range adaptation may e.g. be from an HDR range to another HDR range. In yet other embodiments, the dynamic range adaptation may e.g. be from an LDR range to another LDR range.

In the example, a merged video signal 6 is provided by a video processing system as previously described. Thus, the merged video signal 6 comprises merging information in LSBs of one or more color components for at least some pixels. Thus, an input receives a merged HDR video signal. As previously described, the video signal is an HDR video signal in that it provides a representation of an underlying HDR image/video sequence. However, the actual video data may be reference to an LDR dynamic range and may specifically be an LDR image generated by a mapping or color grading from an HDR image. However, by applying the inverse mapping, the original HDR image can be generated and thus the received video signal is inherently a representation of an HDR image/video.

The system further comprises a reader 72 which is arranged to read at least one or more least significant bits for one or more color components of the video signal for a given pixel. The reader 72 is then arranged to generate one or more values A from the read least significant bits where the one or more values A indicates a merging property for the given pixel. The merging property is indicative of a property of a merging in the HDR video signal of one or more overlay signals 3, 4 with a video image signal 2 for that pixel. Specifically, the value A for a given pixel is indicative of the merging operation performed by the merger in the encoder for that pixel.

The reader 72 is coupled to an adapter 71 which is arranged to adapt the video and specifically is arranged to perform a dynamic range adaptation to images of the video signal. Further, the adapter 71 is arranged to adapt the pixel values in dependence on the generated value or values (A). Thus, the adapter 71 receives pixel values that are referenced to a given input dynamic range (e.g. an LDR range of, say, 100 nits) and to generate new pixel values that are referenced to a different output dynamic range (e.g. an LDR range of, say, 1000 nits). However, the adapter 71 does not apply the same dynamic range mapping or function to all pixels but rather modifies the dynamic range mapping/function depending on the received merging properties for the pixels. For example, a different mapping may be applied to pure video pixels than are applied to subtitle pixels (as indicated by the values A).

The adapter 71 thus generates an output signal which is referenced to a different dynamic range than the received merged video signal 6. This signal may then be fed to a display suitable for rendering this range. For example, a received LDR image may be converted to an HDR image and rendered on an HDR display.

However, due to the adaptation being made dependent on the merging performed at the encoder side, a substantially improved adaptation can be performed resulting in display images that are perceived to be of much higher quality. For example, the brightness of subtitles may be reduced to more suitable levels without comprising the rendering of the underlying image and/or the flickering of graphic elements may be reduced.

In the example of FIG. 9, the dynamic range adaptation DRA is thus made dependent on the value A. The value A is read in the reader 72 of the decoder and a signal 73 indicating this value A (either directly or after conversion to another form) is provided to dynamic range adapter 71, which then adapts the pixel values in dependence on this value A. The dynamic range adapter 71 may in some embodiments be provided signal 55 (see FIG. 7) thereby providing information on how to perform the dynamic adaptation, i.e. which luminance or color mapping functions to apply to the input image pixel values to obtain the output image of desired dynamic range. Alternatively, the apparatus (display) may use its own method to do the dynamic range adaptation, i.e. the dynamic range adaptation and the dependency on the value A may be determined in the apparatus without any specific adaptation information being received from an external source (except for the merging property values A).

The decoder apparatus of FIG. 9 may be provided with a signal 56 that includes information on the encoding of the merging property values in the color component. Specifically, the signal 56 may provide information on which bit comprises what information. In the specific example, signal 56 may e.g. include information indicating: "The least significant bit of the blue color component is used to encode merging property information with "0" indicating that the pixel is a video pixel and "1" indicating that the pixel is an overlay pixel."

The adapter 71 may be arranged to perform the adaptation in response to these values. Specifically, pixels that have a value of "1" in the LSB of the blue color component are not subjected to a dynamic range change or at least are not to subjected to the same dynamic range adaptation as video pixels. Consequently the pixels indicated by a "1" in the LSB of the blue channel do not have their luminance e.g. boosted (or it is e.g. boosted differently). In FIG. 9 this is indicated by those parts of the image on the screen that are video pixels, i.e. the pixels having a value of "0" in the LSB of the blue component, have thickened lines, while those parts that have a "1" in the LSB of the blue component (in this example subtitles and menus) have thinner lines. The menus and the subtitles are then displayed in a non-boosted manner. This may substantially improve the perceived image quality in many embodiments and scenarios.

In the system, the reader 72 is arranged to generate information from LSBs values of the color components. The reader 72 thus reads the relevant LSBs, possibly guided by a signal 56 indicating to the reader 72 which LSBs to read and/or how to interpret them. The reader 72 then generates one or more merging property values A from said LSBs. These values are used in adapter 71 to steer or control the adaptation.

The described approaches may provide improved performance and in particular an improved user experience in many scenarios. The approach may in particular provide an improved rendering of combined video (comprising both underlying images as well as overlay) on displays which require dynamic range adaptation to be performed. Indeed, in many embodiments, a substantially improved rendering of images from an HDR display can be achieved based on an input video that is optimized for an LDR display. Thus, improved performance can be achieved for many embodiments where dynamic range adaptation is used to increase the dynamic range. Similarly, in many embodiments, a substantially improved rendering of images from an LDR display can be achieved based on an input video that is optimized for an HDR display. Thus, improved performance can be achieved for many embodiments where dynamic range adaptation is used to decrease the dynamic range.

With the increased prevalence of displays with varying dynamic ranges (and specifically with varying maximum brightness levels), the need for dynamic range adaptation is becoming increasingly widespread and necessary (dynamic range adaptation is often referred to as color grading or tone mapping where color grading/tone mapping may specifically be luminance grading with only luminances being changed). However, adapting between different dynamic ranges and maximum brightness levels (white spots) is inherently a very difficult thing to achieve. Indeed, conventionally, such dynamic range adaptation has been performed by a person manually (or in some cases semi-automatically) optimizing individual images for a given display white spot. For example, when converting movies from film to television, a substantial dynamic range reduction is typically needed, and therefore a manual color grading to, typically, an LDR dynamic range has been performed (e.g. when converting a motion picture to DVD). Even for a skilled artisan such dynamic range adaptation is very difficult and the optimization is very time consuming. Further, the approach inherently only allows the dynamic range adaptation for one, or at least very few, dynamic ranges/white spots with every single dynamic range requiring a separate manual creation.

As the variety of dynamic ranges being in use has increased substantially, this approach is no longer feasible or at least is not desirable both in terms of the resource required to perform such color grading and in terms of the resource required to distribute multiple versions of the same content. Accordingly, local and automated color grading performed in individual devices is becoming more and more popular. For example, many displays comprise functionality for performing an automatic color grading/dynamic range adaptation to modify a received video signal to the specific dynamic range/white point of the display. This is in particular important for HDR displays which for compatibility reasons (including backwards compatibility) typically include functionality for adapting different dynamic range input signals to the specific dynamic range corresponding to the white spot of the display. Specifically, most HDR displays include an LDR to HDR mapping functionality.

However, the task of creating suitable images for different dynamic ranges is very difficult.

In order to represent images in a suitable format for a given dynamic range, it is often used to employ a code allocation function or electro optical transfer function (EOTF). Such a code allocation function or EOTF provides a mapping between the (digital) values and a corresponding light output, i.e. the code allocation function for a given image/range provides a map from HDR linear luminance values to suitable quantized luma codes. HDR linear luminance values are often represented as e.g. floating point values with a relatively high number of bits per value (e.g. 16 bits). In contrast, the quantized luma codes typically represent luma values by a relatively low number of bits (e.g. 8 bits), and often as integer values.

It should be noted that the difference between LDR and HDR is not just the size of the dynamic range, Rather, the relative distribution of intensities in most scenes is also substantially different for LDR and HDR representations.

Indeed, HDR images/video typically have a different intensity distribution than the conventional (LDR) images/video. Especially the peak-to-average luminance ratio of high-dynamic-range image data is much higher. Therefore, conventionally applied code allocation curves or EOTFs tend to be sub-optimal for HDR data. Thus, if a conventional LDR mapping from HDR luminance values to encoded luma values is used, a significant image degradation typically occurs. For example, most of the image content can only be represented by a few code values as a large number of codes are reserved to the increased brightness range which is however typically only used for a few very bright image objects.

Current standard dynamic range video, intended to be displayed on a reference monitor of e.g. 100 $cd/m^2$ peak brightness, is usually encoded in current standard luma/luminance domains, which are specified using their log curves or code allocation functions/EOTFs. Examples of this are the curves used for sRGB or ITU Rec. 709 logarithmic data.

HDR images/video typically have a different brightness (e.g. when defined as display rendered luminance) distribution than current standard dynamic range images. For example, while the current video content distribution typically peaks around 20% of peak brightness (which means that the luma codes are nicely spread around the half of e.g. 255 values), HDR content may oftentimes typically peak around a much lower percentage, e.g. 1%, of peak brightness (data of at least the darker regions of the HDR images spread around the code at $1/100^{th}$ of code maximum). Thus, most of the relevant HDR content will be contained in only a few of the 8-bit or 10-bit video levels when it is encoded using current standard log curves. This will lead to severe and unacceptable quantization artifacts in the preview image, thus preventing the colorist to color grade/correct HDR images.

Accordingly, if conventional code allocations functions are used for HDR images in order to generate suitable codes for existing displays with such 8-bit or 10-bit input formats, a substantially reduced quality of the displayed image will result with e.g. most of the intensities present in the image being distributed over only a few input levels.

The code allocation function, which maps linear light luminances to how they are to be seen upon display rendering to actual technical codes, or vice versa, have however conventionally largely been based upon LDR models (like gamma 2.2), but were optimal only for LDR displays of peak brightness of around 100 nit or $cd/m^2$ (henceforth both the terms nit and $cd/m^2$ will be used). If such approaches are used for a HDR display (e.g. with a peak brightness of 5000 nit) one risks seeing artefacts, such as banding in the darker parts of the video (e.g. banding in a dark blue sky, especially for fades).

Accordingly, in order to best support HDR images, a suitable code allocation curve should be used such that a sufficient number of quantization levels is assigned to the most important video data.

However, finding a suitable code allocation function is not only critical but also difficult. Indeed, a challenge when determining code allocation functions is that of how to best map between the input luminance values and the luma codes. Indeed, this is a critical issue as the selected mapping has a strong impact on the resulting quality (e.g. due to quantization error). Furthermore, the impact on image quality may be dependent on the characteristics and properties of the images being encoded/decoded as well as the equipment used for rendering the images.

Of course, the simplest approach would be to simply use a uniform quantization. However, such an approach tends to result in suboptimal performance in many scenarios. Accordingly, code allocation functions have been developed wherein a non-uniform quantization has been applied. This may specifically be performed by applying a non-linear function (luma code mapping/tone mapping function) to the input luminance values followed by a linear quantization. However, as mentioned, it has been found that the defined functions in many scenarios provide a suboptimal result. For example, applying a code allocation function to HDR images in order to e.g. allow these to be processed by LDR circuits with a relatively low number of bits per value (typically 8 bits) tends to result in suboptimal conversion of the HDR image and specifically in the image values being concentrated around a few quantization levels/codes.

In some sense, a dynamic range adaptation may be seen as a conversion from one code allocation function associated with one dynamic range/maximum brightness to another code allocation function associated with another dynamic range/maximum brightness. The codes representing the image before and after the dynamic range adaptation may have the same or a different number of bits.

The issues may be illustrated by considering the scenario for an exemplary image (see FIG. 10) illustrating a night scene comprising a dark monster 1001 hiding in shadows next to an averagely lit up house 1003 with some bright streetlights 1005 in front. Further an average grey or dim car 1007 may be present.

Figure 10:
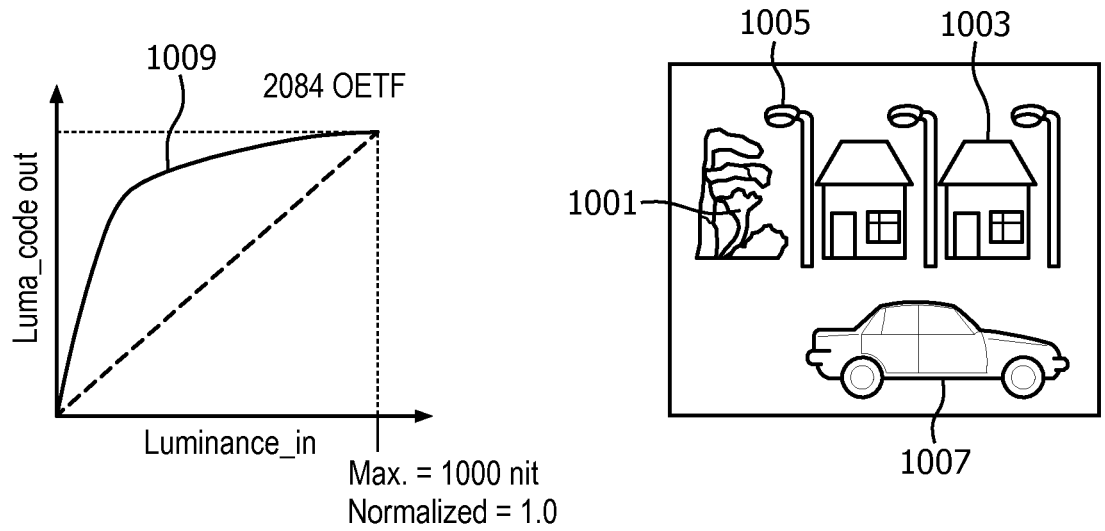
FIG. 10 illustrates some examples of dynamic range adaptation.
Figure 10:
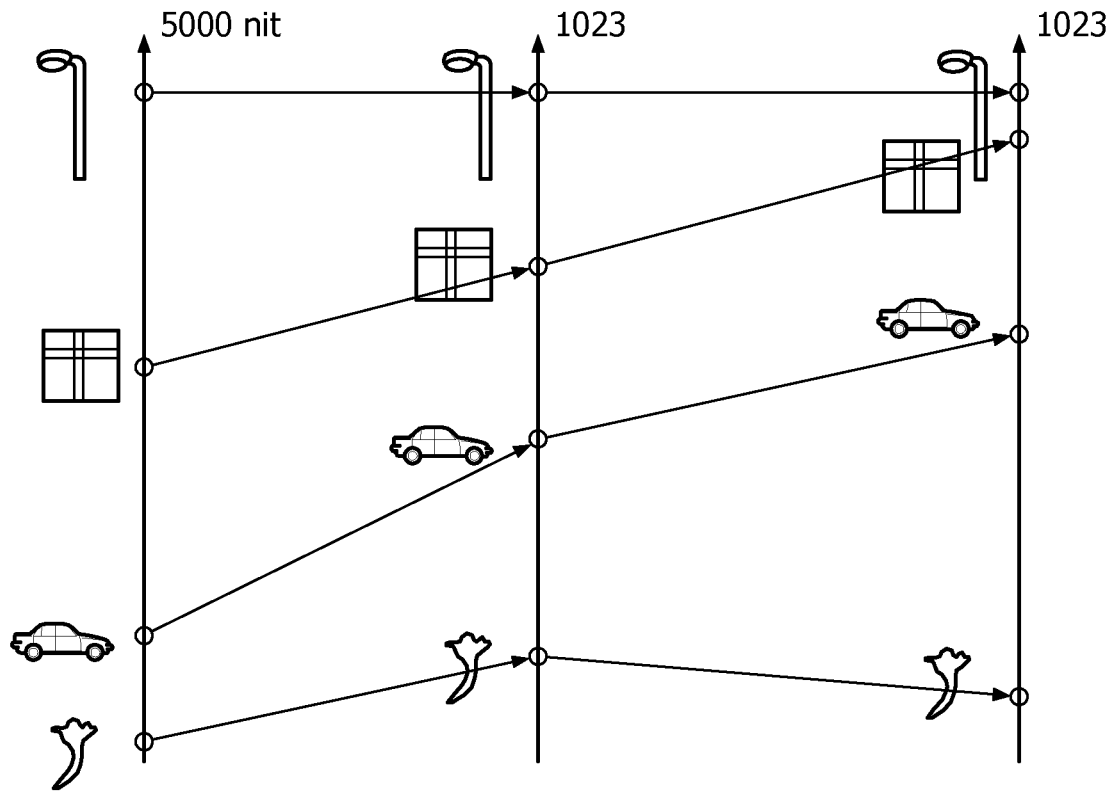

FIG. 10 illustrates three representations of this image. On the left hand side is shown the actual brightness (in nits) of the scene in real life (as captured by an HDR camera which in the example can capture brightness up to 5000 nits, or typically it may represent a 5000 nit reference range master HDR grading of an original camera capture). The captured data is typically captured at a high resolution and is typically reduced to a relatively low number of values. In the specific example, 1024 luma codes are available to represent the range up to 5000 nits. A simple linear mapping of the 5000 nits into 1024 luma codes is however not suitable as this would result in very few values being available to provide differentiation in the dark areas whereas an unnecessarily large number of codes would be available for bright areas. This would introduce artefacts such as banding in dark areas etc.

Instead a non-linear code allocation function 1009 (EOTF) is used, and specifically the OETF defined in SMPTE2084 is used (which is a log-gamma shaped function). As a result, more codes are allocated to dark areas and fewer to bright areas. As illustrated, this results in the distance in code values between the monster 1001 and the car 1007 being larger than the difference between the house 1003 and the car 1007 despite the opposite being true for the brightness in the real scene (when measured in nits). Similarly, the difference in codes between the bright street light 1005 and the house 1003 is reduced. The OETF of SMPTE2084 (henceforth referred to as SMPTE2084) has been designed for a dynamic range (maximum brightness) of 1000 nits, and thus if the image is displayed on a 1000 nits display, the OETF 2084 can be used to decode the received luma values directly.

However, if the display has a different dynamic range, decoding using OETF 2084 and directly (linearly) scaling this to the dynamic range of the display is unlikely to provide suitable results. Rather, as the human perception is not linear with respect to brightness levels such an approach would result in an undesired result. For example, for a higher dynamic range (e.g. 5000 nits), this would result in many bright (but not superbright) objects (such as the house 1003) being rendered as being very (too) bright. Similarly, for a lower dynamic range (e.g. 100 nits), this would result in many bright (but not superbright) objects (such as the house 1003) being rendered as being quite (too) dark.

In some scenarios, data may thus also be provided (e.g. on a Bluray Disc) which is related to an EOTF that is associated with a different dynamic range. For example, FIG. 10 illustrates an alternative EOTF which is suitable for HDR image encoding when an LDR image is needed for direct rendering (namely the mapping between the third and first axis, i.e. the combination of the two successive mappings). As can be seen, an even higher number of codes are allocated to dark values with fewer being provided for bright values. The specific example may for example be used to provide an SDR graded look (i.e. suitable for LDR presentation) using a conventional gamma 2.2 EOTF. Such a representation may for example be used directly by a legacy LDR display.

In some systems, it has been proposed to use an adaptive EOTF, i.e. the EOTF may vary in time (between different frames) and/or spatially (between different areas of the image).

Thus, in some scenarios, a spatially differentiated approach may be used where more than one EOTF may be provided for an image. For example, the image may be divided into a few regions (e.g. one corresponding to a dark region and one corresponding to a brighter region of the image), and an EOTF may be provided for each region. This may allow the EOTF to be optimized for the different characteristics of different parts of the image, and it may provide improved rendering for some images (such as images including both very dark and very bright regions).

For example, for the region corresponding to the dark area that includes the monster 1001, an EOTF may be used which has a very large number of codes allocated to dark values. This may locally increase the resolution in the dark range thereby providing improved differentiation (e.g. allowing the monster to be seen despite the whole region being dark). At the same time, a different EOTF may be provided for a region that has been identified as being brighter. For example, a different EOTF may be provided for the brighter region around the car. This EOTF which is used for e.g. the brighter region comprising the car may have fewer codes allocated to dark values and more codes to the midrange. Again this may improve differentiation and reduce banding etc. Using this approach thus allows improved representation of the scene as a whole (with e.g. reduced quantization error). Similarly, the EOTF may in some cases be adapted between frames such that e.g. it provides a higher number of codes to a dark range for dark images than for bright images.

However, typically, only one EOTF is provided per image/frame, and typically only one EOTF is provided for a group of images/frames, and indeed often only one EOTF is provided for the video sequence. The following description will focus on one EOTF being provided for each image and for a sequence of images. However, a particular problem with overlay may occur when adaptive EOTFs are used and this will be described in more detail later.

It will be appreciated that the merged video signal 6 may be represented by luma codes corresponding to one of the described EOTFs. It should also be noted that if e.g. the video image signal comprises luma codes based on an EOTF linked to an SDR range, it is still possible to recreate the original HDR values from the luma codes and that accordingly the image is still a representation of an HDR image.

Thus, if a display receives a video signal in accordance with an EOTF associated with a specific dynamic range, it may be desirable to perform a dynamic range conversion if the dynamic range does not match that of the display. However, as mentioned, this is not merely a case of providing a linear scaling. Rather, to reflect the human visual system, the dynamic range adaptation should typically be non-linear (although possibly piecewise linear). For example, dark levels should typically not be increased in brightness despite the dynamic range being significantly increased. In other words, dark signals are often not compressed significantly in a color grading for LDR displays. Mid-level brightness levels should however typically be boosted somewhat in brightness although typically it is important that the boosting is not too substantial as this may create an artificial look with too many bright areas. However, in contrast, very bright objects should be boosted very substantially and indeed for the brightest objects (say a car light in a dark image) should often be set to the maximum level. Accordingly, a progressive dynamic range mapping is typically used where the additional dynamic range and the increased brightness is typically predominantly used to increase the brightness level for brighter elements. It will be appreciated that many different dynamic range mappings may be possible.

Figure 12:
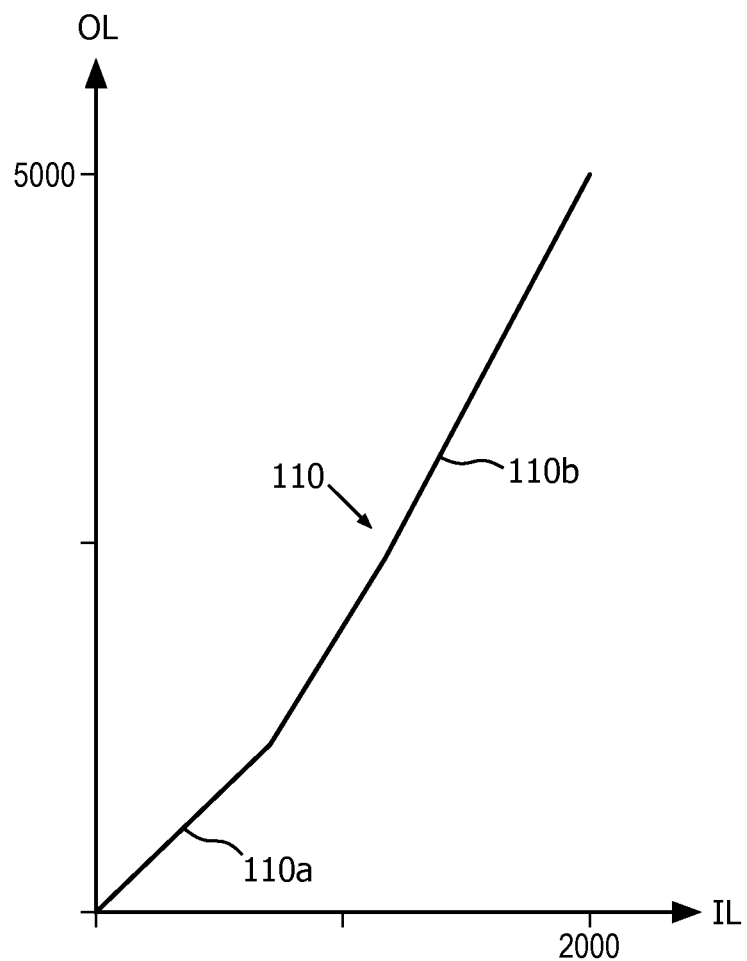
FIG. 12 illustrates some examples of dynamic range adaptation.

An example of a dynamic range mapping is illustrated in FIG. 12. In the example, a straight linear mapping is provided for all brightness values below a threshold and a different linear mapping is provided for all brightness values above the threshold. The approach may result in a relatively modest (or no) boosting for dark and medium brightness levels whereas very bright areas are boosted substantially more. This effect reflects both typical brightness conditions in the real world as well as the perception of the human visual system.

However, such a dynamic range mapping provides only an approximation to the ideal grading. One issue is that the curve is relatively simple and accordingly in general cannot reflect the optimal dynamic range mapping. Another problem is that the dynamic range mapping is based on assumptions of the image content being displayed, and as such it is optimized for an assumed typical image of a real life scene. However, for other images, or other content types, the curve may provide less than ideal performance with often significant degradation.

Indeed, the inventors have realized that a particular problem often occurs with overlay data. For example, often overlay graphics is displayed as bright image objects that stand out from the underlying image. However, whereas bright objects in the image should be boosted very substantially (becoming "super bright"), such a dynamic range adaptation will result in the overlay graphics becoming unpleasantly, and sometimes even uncomfortably, bright. Thus, the application of the same dynamic range adaptation tends to result in highly undesirable effects for overlay graphics.

In many embodiments, the dynamic range adaptation is performed at the display. This may allow the dynamic range adaptation to be adapted to the specific characteristics of the individual display and may allow the display to be used with a large variety of sources. In many displays, overlay graphics (e.g. a display menu) may be generated by the display and overlaid the received image. These overlays are typically rendered at a suitable brightness determined locally and taking the dynamic range of the display into account.

However, if the overlay graphics is introduced externally to the display, e.g. by a set top box, the display simply receives an image comprising both the original image and the graphics. The display then performs range adaptation resulting in the unpleasant rendering of the overlay graphics. For example, if subtitles are added by a BD player, these will often by presented at an uncomfortable brightness on an HDR display.

The issue may be particularly problematic for images where the graphics is blended with the original image, such as e.g. where semi-transparent subtitles are used. The semi-transparent overlay may in this case increase the brightness of the corresponding pixels, e.g. resulting in the brightness exceeding that of the threshold of the dynamic range mapping of FIG. 12. As a result of the combination of the image and overlays, a high brightness boost may accordingly be provided. This may result in perceived distortion to the underlying image in addition to typically the overlay being perceived as too bright. For example, for an image of a face with overlaid subtitles, a standard dynamic range adaptation may not only result in too bright subtitles but also in the face appearing brighter for the area in which the subtitles are shown than for the rest of the face. Thus, an unnatural look results.

The issue may be even further exacerbated when an adaptive EOTF is used. For example, in some scenarios, a different EOTF may be used for dark areas than for bright areas. Applying a fixed dynamic range adaptation to such a scenario (e.g. with a fixed mapping of input luma values to output luma values) followed by an interpretation of the adapted values based on the local EOTF will result in the effective boosting of the graphics overlay being different for different parts of the graphics. For example, the dynamic range adaptation may map a luma value of 723 (e.g. related to a 1000 nit range) to a value of, say, 617 (e.g. related to a 5000 nits range). However, this value may for a dark area EOTF be interpreted to correspond to, say, 110 nits but for a dark area EOTF be interpreted to correspond to, say, 150 nits. Thus, if a graphics overlay extends over both the dark and bright area, the luminance of the graphics will actually change when displayed despite this not being intended. Thus, a fluctuation will occur across the graphics overlay.

The same will occur when EOTFs are applied which are adaptive in the time dimension. In such scenarios, the brightness of the graphics will change between different frames resulting e.g. in pulsating subtitles being generated.

Figure 22:
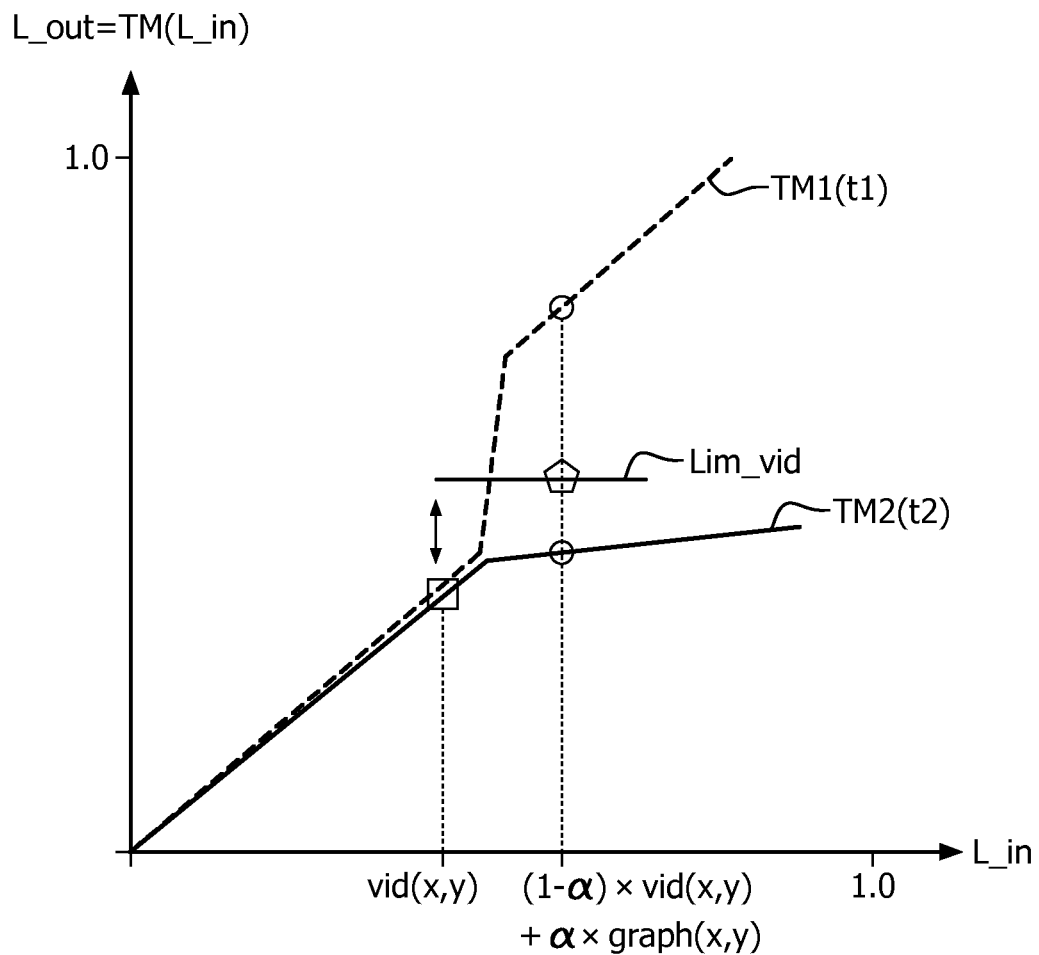

This may be illustrated by the example of FIG. 22 which illustrates two possible EOTFs that may occur at different times. In the example, the EOTF named TM1 may be an EOTF provided for a first frame, and the EOTF named TM2 may be an EOTF received for a second frame. The two EOTFs thus represent two different dynamic range mappings which are applied to different frames of a video sequence.

In the example, TM2 is a dynamic range mapping (EOTF and also sometimes referred to as a tone mapping) for received video pixel luminances (or lumas) at a first time moment. The mapping is actually meant for the underlying video content (i.e. it has been designed to provide a desirable look when video is presented). However, if a pixel comprises overlay this results in the pixel having a brighter luminance (1-alpha)*vid(x,y)+alpha*graph(x,y) (e.g. because some bright text or menu color has been mixed in with the underlying video). Although the processing with TM2 may not increase the value a lot above the luminance of the surrounding video pixels, the dynamic range mapping at least provides for the graphics/overlay regions not to suddenly become very bright. If instead TM1 were used, then the overlay parts would become very bright as the additional contribution from the overlay pushes the input luminance to a level where it is boosted very aggressively by TM1.

Therefore, if the provided dynamic range mappings (EOTFs) change dynamically in time, the presentation of the overlay pixels (e.g. subtitles and menus) will change between different frames. This would be seen by the viewer as e.g. white menu text oscillating between dark and bright values merely because it was mixed with video, but that may be undesired for that region. Instead, some embodiments of the current approach allow the detection of such pixels, and then the rendering at a limited luminance Lim_vid, e.g. 20% brighter always for graphics pixels than the received input luminance (1-alpha)+alpha*graph(x,y); or e.g. 50% brighter for the text in a menu, and 10% brighter for the background graphics pixels in the menu rectangle.

Thus, dynamic range adaptation to match a specific display is very challenging for standard video but is particularly difficult for merged signals comprising graphics overlays. Indeed, conventional approaches where graphics are simply added at a separate device external to the display tends to lead to substantial artefacts being introduced, and in particular tends to lead to e.g. luminance distortions and variations for the graphics.

It has been proposed in WO2014/130213 that the overlaying of graphics, i.e. the merging of graphics with video, should be made dependent on information provided to the external device by the display. Thus, in the system proposed in WO2014/130213, the display communicates data to the external device relating to the external device e.g. whether the display is an LDR or HDR display. In response, the external device adapts the properties of the graphics overlay before the merging and then provides the merged image to the display which proceeds to display the image as it would an image without any graphics overlay. Thus, in the approach, the display simply treats all images the same way but the external device may prior to the merging adapt the graphics overlay based on display property data received from the display.

In the systems of FIGS. 1-7 and 9, a different approach is taken. In these examples, merging may be performed without considering specific characteristics of the display, i.e. the external device may not have any information of the specific display being used. No adaptation of the individual components prior to the merging is performed. However, the external device provides merging property information to the display which may be used by the display to perform an adaptable dynamic range adaptation to re-target the image to be displayed with the specific dynamic range of the display.

Thus, in the current approach, a feed forward structure is applied wherein the source external device (e.g. a BD player) provides additional information to the display which may control or steer the dynamic range adaptation of the display. This is in contrast to the prior art feedback approach wherein fixed dynamic range adaptation is used and where only a modification of a graphics overlay prior to merging and based on information fed upstream is performed.

The approach provides a number of advantages. Firstly, in many embodiments, it allows a substantially improved image to be generated with rendering of graphic overlays and/or the image being a more accurately adapted to the specific display. For example, EOTFs directly reflecting the properties of the individual display can be used. Indeed, the dynamic range adaptation may in many embodiments be individually optimized for respectively the image content and the overlay content. E.g. for pixels being designated as video or image pixels, a video dynamic range mapping may be applied which reflects an optimized (in some way) mapping of image content to the specific dynamic range (and other characteristic of the display). For pixels designated as overlay pixels, a graphics dynamic range mapping may be applied to provide a desired rendering of graphics overlays.

Thus, in many embodiments, the approach may allow an individually optimized dynamic range adaptation for respectively video/image content and for graphics overlays.

The approach may in particular allow the control over the dynamic range adaptation to remain with the display, i.e. the display comprises the functionality for adapting an input dynamic range to the dynamic range of the display. This may be highly advantageous as dynamic range mappings and indeed EOTF may be optimized for the exact characteristics of the display. It may often provide a more flexible mapping and control over the graphics overlays and in particular for areas where contributions are present from both the video and graphics (specifically transparent graphics). The display may for example set the graphics to a predetermined brightness (e.g. set by the user of the display).

Also, in many situations, improved resource is available for a display. For example, typically televisions are relatively high cost items whereas e.g. many BD players are very low cost items. Accordingly, televisions often have substantially more computational resource, and indeed the financial resource available for design and development may be substantially higher. Therefore, the dynamic range adaptation of televisions may often be better than those of cheap BD players. The described approach allows for the dynamic range adaptation to be performed further downstream from where the merging is performed rather than requiring any adaptation to be before merging. This allows such improved dynamic range adaptation to be utilized also for merged images comprising overlays.

The approach thus allows a downstream dynamic range adaptation to be adapted to the individual pixels, and specifically allows it to be adapted to the specific merging property of the individual pixel. Indeed, in some embodiments, individually optimized adaptation of image and graphics content can be achieved downstream of the merging.

The exact dynamic range adaptation and dynamic range mapping that is performed, and indeed the dependency on the merging property, may vary between different embodiments depending on the preferences and requirements of the individual embodiment.

In the following, some possible approaches of the adapter 71 will be described and in particular some examples of differentiated dynamic range mapping depending on merging properties will be described. However, it will be appreciated that these are merely exemplary and that other approaches may be used in other embodiments.

In some embodiments, the merging property indicated by the value A may reflect whether the corresponding pixel is an image/video pixel or whether it is an overlay graphics pixel. Thus, in this example, a pixel may be considered to either correspond to an underlying image/video pixel or it may be an overlay pixel. In such an example, the adapter 71 may be arranged to apply a first dynamic range mapping if the pixel is indicated to be a video pixel and a different second dynamic range mapping if the pixel is indicated to be an overlay pixel.

For example, the first dynamic range mapping may map an incoming LDR dynamic range to an HDR dynamic range by providing a very aggressive boost for high brightness levels. E.g. a mapping corresponding to that of FIG. 12 may be used for the first dynamic range mapping. In contrast, the second dynamic range mapping may be a simple linear function that does not provide any additional boost to high brightness levels. Indeed, the second dynamic range mapping may be a simple identity mapping resulting in the brightness of the overlay pixels being exactly the same whether presented on an LDR display or an HDR display. Thus, as a result of such an approach, an HDR scene representation may be achieved with e.g. bright light sources such as street lights or the sun being shown at very high HDR brightness levels whereas overlay such as subtitles are still shown at normal brightness levels.

As a specific example of such an approach, a merging property may be generated which e.g. may indicate that the pixel is an overlay pixel. The source of the overlay may either be from e.g. a local graphics generator, such as e.g. a generator generating subtitles or a menu. Alternatively, the overlay may be received as part of a second video image signal where this signal may comprise overlay content, such as e.g. graphics or subtitles.

In such a scenario, the adapter 71 may be arranged to adapt the pixels within a region for which it is indicated that the pixels are overlay content such that the luminance values are restricted to a given predetermined range. This may ensure that the overlay is presented within a reasonable brightness range regardless of the display brightness capabilities.

The predetermined range this may e.g. for a display be a preset range reflecting the dynamic of the display. E.g. the range may have an upper limit of, say, 10% of the peak brightness, and a lower limit of e.g. the larger of 1% of peak brightness and 1 nit. Alternatively or additionally, the predetermined range may be determined by the viewer etc.

It will be appreciated that the approach may readily be extended to more than two categories with a separate dynamic range mapping being selected for each category. For example, the value A for a pixel may indicate whether the pixel is a video pixel, a subtitle pixel or a menu pixel, and one of three possible dynamic range mappings may be selected accordingly. In this example, the graphics category is thus further subdivided into a plurality of subcategories indicating a specific graphics type.

It will also be appreciated that the approach is not limited to a hard allocation of a given pixel into a specific category being indicated by the value A. For example, the value A may indicate a relatively weight of graphics relative to image for a given pixel. The adapter 71 may then select the first dynamic range mapping if this is below, say, 50% and the second dynamic range mapping if it is above, say, 50%.

In many embodiments, the adapter 71 may be arranged to reduce a boosting of brightness values for pixels for which the value A is indicative of the pixel belonging to an overlay relative to a boosting of brightness values for pixels for which the value A is indicative of the pixel belonging to video/image signal. The reduction may be for higher brightness values which specifically may be brightness values above a threshold (e.g. of 50%, 60%, 70% or 80% of the maximum brightness level of the input signal to the adapter 71).

In some embodiments, the adapter 71 may be arranged to restrict a brightness level for pixels indicated to be overlay pixels to a limit brightness level below the maximum possible brightness level for the output of the dynamic range adaptation. Specifically, the dynamic range adaptation may perform a dynamic range mapping from an input dynamic range to an output dynamic range. The output dynamic range may have a maximum possible brightness level. However, for pixels belonging to an overlay category (as indicated by the value A), the dynamic range mapping is restricted to a maximum or limit brightness level that is lower than this maximum level. The limit brightness level for an overlay pixel is thus lower than for a non-overlay (video) pixel and in many embodiments there may be no brightness limit for video pixels (except for the maximum value of the output dynamic range).

In some embodiments, the same dynamic range mapping may be applied to all pixels independently of the merging property (i.e. independently of the value A) up to a given brightness level. However, for values above this brightness level, different dynamic range mapping may be applied for different values of the merging property. As a specific example, the same dynamic range mapping may be applied to all pixels except that the maximum output brightness level is limited to a maximum value for overlay pixels.

Such an approach may for example provide an efficient mapping that provides pleasing results and both allows e.g.

grey graphics to be supported for an HDR display while ensuring that bright graphics do not become too grey.

In some embodiments, the adapter 71 may be arranged to allocate substantially the same brightness level to pixels that are indicated to be overlay pixels. For example, a normal dynamic range mapping may be applied to video pixels whereas graphic pixels are simple given a predetermined value. Such an approach may result in a very pleasing result with not only a suitable (for the display) presentation of graphics being achieved but also this presentation is ensured to be stable. For example, such an approach would be insensitive to adaptive changes in the applied EOTF and would prevent fluctuations across the image or between frames.

Figure 11:
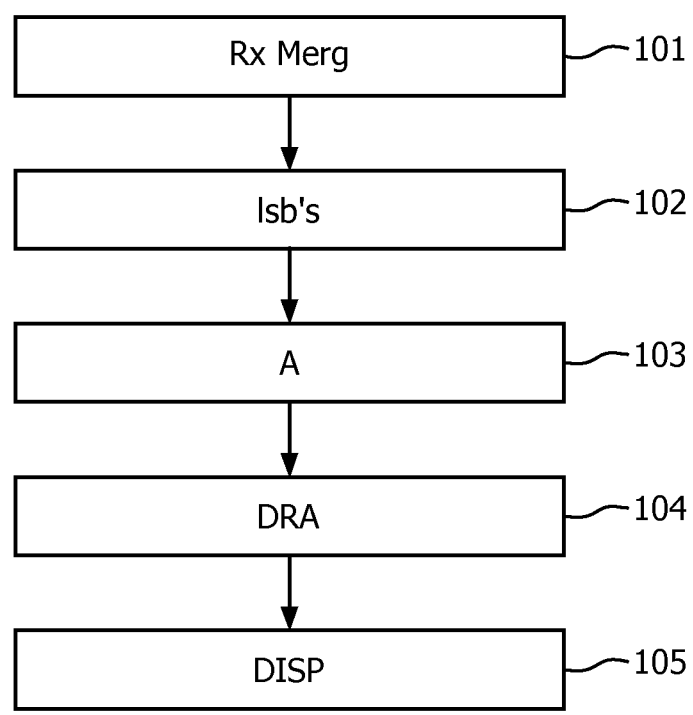
FIG. 11 illustrates an example of a system in accordance with some embodiments of the invention.

FIG. 11 illustrates a method in accordance with some exemplary embodiments of the invention.

In step 101 the merged image data (the merged video signal 6) is received. One or more of the LSBs are then read in step 102 by a reader 72. A value A indicative of a merging property for a merging performed at the encoder side is then generated in step 103. In step 104 dynamic range adaptation is performed on the image, in dependence on the generated value A. The resulting image is the displayed in step 105.

It will be appreciated that e.g. steps 102 and 103 may be performed in a single step. It will also be appreciate that the method may comprise further steps, for instance metadata or flags may be read. As an example, signal 56 may be read at an input and the retrieved information may be used to control the operation in step 102 and/or 103, e.g. it may control which values A are to be extracted from the color components. It may also control operation in step 104, i.e. how the adaptation is to be performed in step 104. For example, metadata may comprise information indicating which LSBs comprise which information. In some embodiments, the generated value A may be determined directly as the value for the relevant least significant bits. It may in other embodiments be a value derived from the appropriate LSBs.

For instance, there may be a choice of using two or three LSBs to indicate transparency of an overlay. The reader 72 may read a value which is in the range from 0 to 3 (including 3) for a two bit indication and from 0 to 7, including 7, for a three bit indicator.

From e.g. metadata in signal 56 the receiving system may then determine whether a two bit or a three bit indicator is used, and it may use this to generate e.g. a transparency value (25%, 37.5% %, 50% etc.). This value A may then be used in step 104.

In many embodiments, the video signal may comprise specific metadata or flags, e.g. indicating how the merging property is encoded.

If a frame or scene (or even a movie) does not comprise any overlay, then it may be useful if the encoder adds such information to the video signal. The decoder may then read this information and based on this it may e.g. ignore the following frame, scene or movie as it knows this will not contain any overlays. Thus, the decoder 'knows' that in the next frame, scene or movie it can bypass the reading and generating steps and go directly to step 105 to perform the dynamic adaptation. It can then also use all bits of the signal as video information, thereby enhancing the video quality.

An example of the method is as follows:

A merged video signal 6 is provided generated by an encoder 51 as described with reference to FIGS. 4 to 7. In the example, a value A of "1" is used to indicate that a pixel is a video pixel and a value of "0" is used to indicate that a pixel is an overlay pixel.

The decoder receives the merged video signal 6 and reader 72 (see FIG. 9) reads the value of A:

If A=0 for a pixel then this pixel is a video pixel and in step 104 dynamic adaptation is performed. For most pixels, this will lead to a change in value.

If A=1 no dynamic range adaptation is performed and the pixel value is not changed. Thus, all graphics/overlay may be rendered without the dynamic range adaptation making a change. Specifically, this may result in e.g. white overlay not being boosted to HDR brightness levels.

This is an example of an embodiment in which the merging type of the pixels is indicated. In the example, two merging types are used and thus a binary value is sufficient: pure video (A=0) and non-pure video (A=1)

A variation on this scheme may be:

Pure video is indicated by a value A of "0", a menu pixel is indicated by a value of "1", and a subtitle pixel is indicated by a value of "2".

If A=0 for a pixel, then this pixel is video and a dynamic range adaptation is performed, leading for many pixels to a change in value.

If A=1 then this pixel is a menu pixel and the pixel value is not changed

If A=2, then this pixel is subtitle pixel, the receiver may employ a table indicating which intensity and thus which component values provides the best visibility for subtitles. The pixel values are substituted by this value.

This is a further example of an embodiment in which the merging type or category of the pixel is indicated. In this example, there are three merging types: pure video (A=0), menu (A=1), and subtitle (A=2)

For menu pixels there may in some embodiments also be 'best values' (e.g. provided by a different table) and for pixels the incoming signal component values may be substituted by such values.

For mixtures of video and overlay, e.g. using a value from 0 to 7, 0 being 100% video and 7 being 100% overlay, the result is e.g. in between the results for the two extremes A=0 (only video) and A=7 (only overlay). For example, for a pixel value with an associated value A between 0 and 7 the following result may be determined:

luminance Value (A)=luminance Value(A=0)+(A/7*(luminance Value(A=7)−luminance Value(A=0))

Or, simply put, a linear scaling between the two extreme pixel values may be performed. The display may thus scale the amount of dynamic range modification depending on the transparency level of the pixel.

The scaling may in some embodiments be non-linear, e.g. if more emphasis is to be given to the video or the overlay. For example, the scaling may be on a logarithmic scale.

In this example, the adaptation is dependent on the value A for a pixel, i.e. on a pixel per pixel basis. In more complex embodiments the decoder may analyse all or a group of values A, or the distribution of the values A over the image or a part of the image, and modify the dynamic adaptation for some (or all) pixels (in dependence on an analysis of the values for A in the image. For instance:

If part of the image is a menu, the image as a whole may be displayed in LDR. E.g. whereas the video area around a menu rectangle may perform an original intended boost, the display may apply the transformations in such a manner that the menu stays around some (LDR) luminance values, e.g. such that it is not brighter than luminance Yx and maybe not darker than Yy. Even if such a relatively simpler strategy may not always calculate the exact required values for mixing colors, it does tend to create more realistic menu colors which oscillate less wildly. There are various manners in which a television can calculate the color transformation so that the end result of all pixels is within the bounds, e.g. it can do so iteratively.

The encoder may provide (in signal 56 or in a separate signal) some statistical information about e.g. the images in a scene or shot. In the simplest form, for instance it may indicate whether or not there is any overlay in an image or even in the entire video or movie, and whether or not there is a menu part (and e.g. statistically some parameters regarding the menu part can be communicating aiding either the processing of such a part, or the identification of its color properties).

FIG. 12 schematically illustrates an exemplary dynamic range adaptation. "Dynamic range adaptation" may be considered a short hand form for any type of dynamic range adapting color transformation, i.e. wherein a signal is color transformed to adapt its luminance from one range, for instance a maximum brightness level of Y nit, to another range, for instance a maximum brightness level of X nit. A color transformation need not (but may) include a chroma transform or change.

The horizontal axis represents the luminance value for the incoming signal, which may for instance be graded for a display with a maximum brightness level of 2000 nit. The incoming signal is to be displayed on a display with can provide a maximum of 5000 nits. The incoming signal is in this example graded for a maximum luminance value of 2000 nits, and it must be mapped, i.e. adapted, to the higher dynamic range of the display.

This is schematically indicated by the graph in FIG. 12 which provides the luminance values for the display (OL, output luminance values) as a function of the luminance values for the incoming signal (IL, incoming luminance values). The relation between the two is given by line 110. Using the dynamic range adaptation/mapping illustrated in FIG. 12 will result in darker parts (luminance values near the lower end of the scale) being rendered the same on all displays, as illustrated in part 110a of line 110, while bright lights (luminances near the upper end of the scale) are boosted, i.e. increased in luminance, as illustrated by part 110b of line 110. Thus, the gradient of part 110a may specifically be one whereas it is higher for part 110b.

The higher range of the display is used for boosting bright objects, such as lights.

This example is for a situation wherein the signal graded for 2000 nit is 'upgraded' to a display that can provide up to 5000 nit luminance.
Other examples include:
1. Input is for 5000 nit, output is either 100 nit (legacy TV) or around 1000 nit (early HDR TV), and
2. Input is for 100 nit, output is around 1000 nit.

This not to be interpreted as being limited to this example; When the display has a luminance range that does not correspond to the luminance range for which the incoming signal is graded, whether it is larger or smaller, a dynamic range adaptation may be performed, and thus upgrading (increasing dynamic range) as well as downgrading (reducing dynamic range) can be performed.

Figure 13:
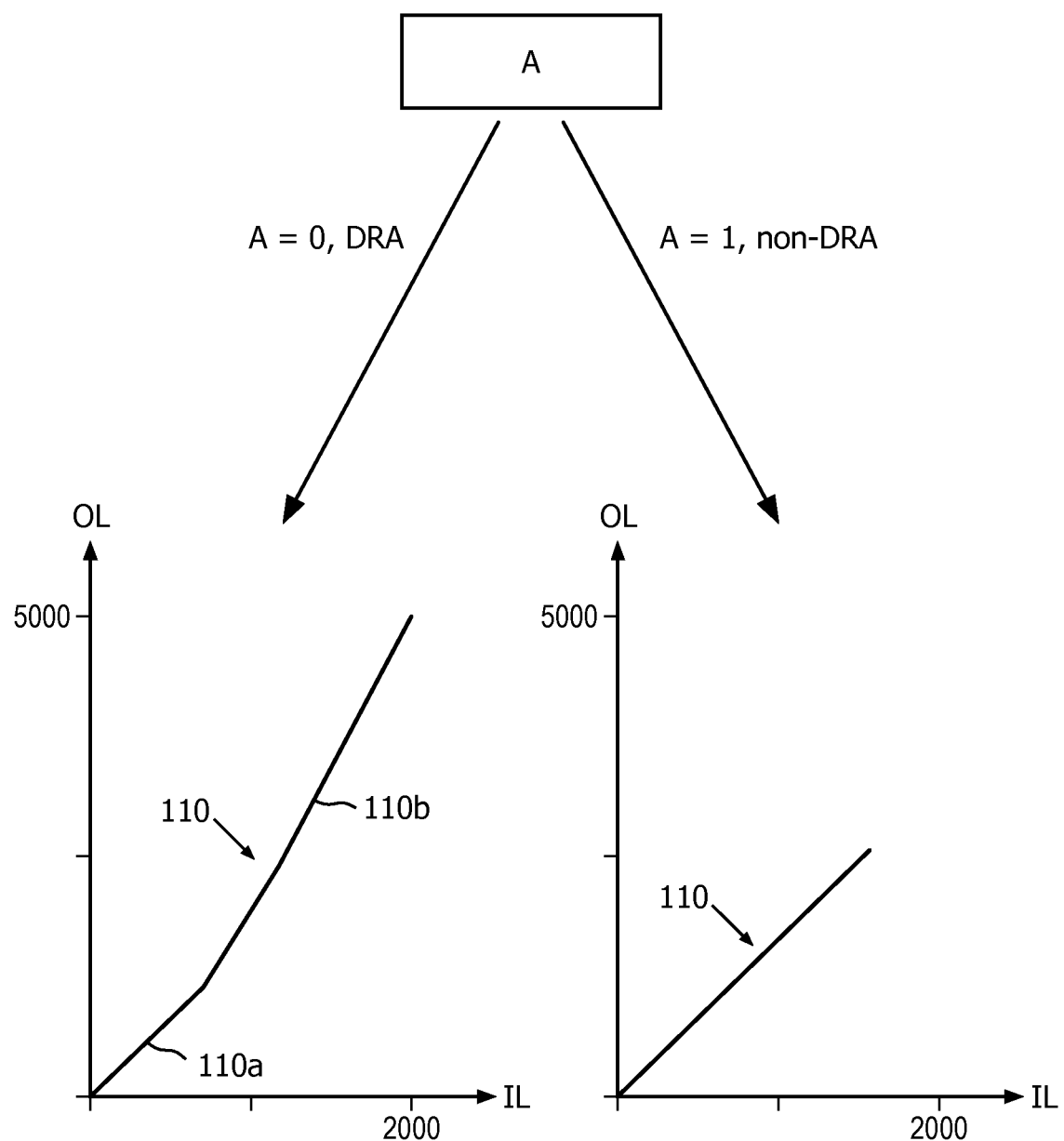
FIG. 13 illustrates examples of aspects of some embodiments of the invention.

FIG. 13 provides an example of a dynamic range mapping in which the value A may be 0 for a pixel of the video and 1 for a subtitle. The value R is read, if A=0, dynamic range adaptation (DRA) is performed. If A=1, then DRA is not performed (non-DRA). In other words, the dynamic range adaptation may apply a dynamic range mapping if A=0 which modifies the brightness values but if A=1 then it will apply a direct one dynamic range mapping where no brightness values are changed.

As another example, the graphic pixels may be subjected to a fixed dynamic range mapping (but not as much as the video) whereas video pixels are subjected to a variable dynamic range mapping (different from scene to scene) The dynamic range mapping applied to the video pixels may also be more complex, for instance the curve may be steeper and more complex.

Figure 14:
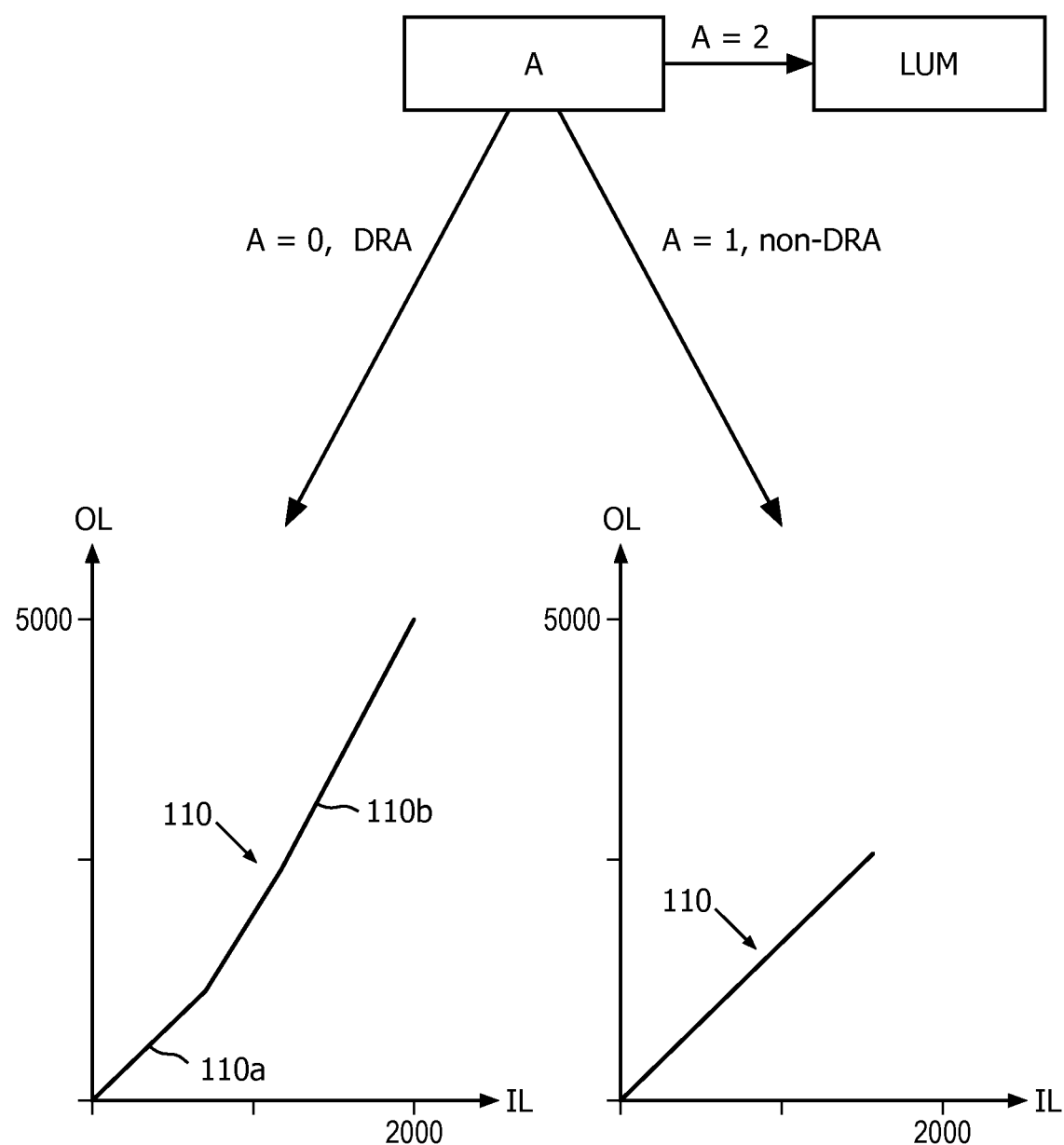
FIG. 14 illustrates examples of aspects of some embodiments of the invention.

FIG. 14 provides a further example. In this case three values are possible for the value A.

If A=0 then the pixel is a video pixel and a dynamic range adaptation is performed corresponding to a mapping suitable for images. This typically leads to many pixels having a change in value (DRA is performed).

If A=1 then this pixel is menu, and the pixel value is not changed (corresponding to no DRA)

If A=2, this indicates that the pixel is a subtitle pixel. In this case, the display has a table providing information on the intensity and thus the component values that are considered to provide the best visibility for subtitles. The pixel values are then set to predetermined values based on a table look-up (the table providing a fixed value considered best suited for subtitles on this display).

Thus, in the example, the pixels of the image is subjected to an adaptation prior to the image being displayed. The adaptation parameters (i.e. how the adaptation is performed) are dependent on the value or values read in the least significant bits, i.e. on the merging property as indicated by the values A. If the value is 0, then the adaptation is different from when A=1 and from when A=2.

In the above embodiments a relatively low number of possible values can be used for the value A. The value may be generally be seen as any combination of bits that is used for conveying information on the merging and specifically on whether or not, and/or to what extent, a pixel is or comprises an overlay. This can be implemented in various ways. For example, in the above example two bits of one of the color components (which will be referred to as component I) may be used as follows:
0=video
1=only menu
2=only subtitle
3=both video and subtitle and/or menu.

In this example, at least one value in one or more of the LSBs may indicate a type of overlay.

This may again be an example of a mixing type indication.

In this example there are four mixing type indications for "pure pixels", namely A=0, 1 and 2 and one type indication for a pixel of mixed type, namely A=3 (with the term "pure" indicating contributions from only one of the input signals, i.e. from either the input image or from one of the overlay signals; and the term "mixed" indicating a contribution from at least two of the signals).

For the mixed type of pixels (when A=3 in the mentioned two LSBs) the transparency of the subtitle and/or menu may then be given in for instance two of the least significant bits for two other components (which for simplicity we denote II and III). If the two least significant bits of component I have a value of "3" this indicates that the pixel is not a pure type pixel but rather is a mixed type pixel. For example, it could be 50% video and 50% subtitle so that the subtitle then has a transparency T of 50% (or it could e.g. be 50% video and 50% menu). The reader 56 may then continue to read the two least significant bits for the two other components II and III. For a first of the other components, for instance component II, the reader 56 reads the two least significant bits and determines a value of 0. This indicates for instance that there is no contribution from subtitles in the mix. It may further read the other component, in this case component III, and may e.g. determine the value 2 being present in the two least significant. This may e.g. indicate a mix of 50% video and 50% menu. If instead, the pixel were 50% video and 50% subtitle, the reader 56 would read a value of 2 in the two least significant bits of the first component and a value of 0 in the other.

This is an example of an embodiment in which both merging type information is provided as well as merging parameters.

This is all given per example, many more possible ways of encoding exists.

A slightly different scheme is to use the following indications:
0=video
1=overlay, or mix of overlay and video In a first example, only this information is used.

This scheme embodies an embodiment which often allows a low complexity implementation using only a single bit while providing an efficient use of the method. The only distinction made is between video and anything else, whether this is an overlay, or a mix of overlay and video, and independent of the nature of the overlay, be it subtitle, menu, logo, advertisement etc.

In slightly more complex embodiments, the transparency of the overlay is given in, for instance, two of the least significant bits in another component.

This scheme embodies an embodiment which often allows low complexity implementation using a minimal number of bits while providing an efficient use of the method.

The above and other embodiments of the invention can be performed using a variable length coding approach.

When merging has taken place, to the approach provides information on the merging and specifically it may provide information on the amount of merging.

However, when no merging has taken place, and in particular if the pixel is only video, it may be important to provide as much information on the pixel values as possible, i.e. to sacrifice as few bits as possible.

In some embodiments, the number of LSBs of the components indicating pixel type (i.e. whether the pixel is video, overlay, type of overlay and/or a mix of these) and/or merging parameters (transparency parameters or mixing parameters) is variable depending on the merging type of pixel. E.g., when the pixel is only video the number of LSBs is lower than when the pixel is a mix.

For instance, in the two above given examples, if the indication is 0 in the two least significant bits of component I, indicating that the pixel is only video, then the two least significant bits of components II and III need not comprise mixing parameters, since there is no mixing.

These two least significant bits can be used for providing more details for the pixel luminance values, i.e. they can be used to increase the resolution of the value.

Therefore the number of LSBs used for values indicating merging type and merging parameters may varies possibly also depending on the merging type. When a variable length coding method is used, it must be known at the decoder side how many LSBs are used. To this end, the signal may be provided with a coding length signal. There are various ways of providing a coding length signal. One simple approach for providing a coding length signal may be to use the value that also indicates the merging type. In that case, the coding length signal is given by the merging type. If the signal is a pure signal, thus of "pure type", then there is no need for information on the amount of merging.

For simple types of pixel, such as pure video or pure subtitle no additional information is necessary. However, for pixels of mixed type, for instance the type of pixels that are formed by mixing subtitles with video, additional information on the amount of merging (for instance whether it is a 50%-50% mixture or a 25%-75% mixture) may be useful and may be encoded in some LSBS. If the pixel composition is simple, i.e. no merging has taken place, the number of LSBs needed for providing all information on the merging is less than for more complex situations.

At the decoder side, the decoder reads the LSBs in which the pixel merging type is indicated, and then proceeds dependent on the value in said LSBs. If the merging type indicates the pixel to be of a mixed type, the LSBs indicating the merging parameters are read. The dynamic adaptation is performed on basis of the read information. If the merging type indicate the pixel to be only video, there are no LSBs indicating merging parameter but instead said LSBs will comprise video information (luminance values for instance) and the decoder will interpret them as such.

Likewise, if it is indicated by a flag that a frame comprises only video, there are no LSBs in said frame needed for conveying information on merging type and merging parameters, and all LSBs for all pixels in said frames can be used for conveying video information. This is a very extreme example of variable length coding and a low complexity way of providing a coding length signal.

Alternatively or additionally, a flag may indicate that in the coming scene, instead of only using merging type indication, there will also be provided in 3 LSBs of a certain color component, further (fine) details on the amount of merging. That again means that a variable length coding signal is provided to the decoding side.

As another example, there are several possible codification schemes that may be used at the encoding, which use different numbers of LSBs. In signal 56 a signal is provided which may signal to the decoding side when the encoder switches from one codification scheme using a certain number of LSB to convey merging information to the decoding side to another codification scheme which uses a smaller or larger number of LSBs. Such a signal may also constitute a coding length signal.

In some embodiments, the merging indications, i.e. the indications of the one or more merging properties may be inserted in one or more LSBs of color component values, such as into an R, G or B value. In some embodiments, these values may subsequently be encoded using a lossless encoding format (or not be encoded but transmitted directly in raw form) and thus in such embodiments, it can be assumed that the received values correspond directly to the transmitted values, i.e. a decoder can assume that the received bits are identical to the ones transmitted. In such a example, the merging data can accordingly typically be assumed to be correct at the decoder and can accordingly be used directly.

In some embodiments, the color component value may be encoded using a lossy encoding. In some such embodiments, it may still be assumed that the received LSBs indicating the merging property are still correct, i.e. the received values may directly be used to determine the values A, and the dynamic range adaptation may be adapted accordingly. This may sometimes lead to errors but in many embodiments, this may be acceptable.

In other embodiments, other precautionary approaches may be used. For example, in some embodiments, error correcting coding of the merging data may be used. This may require additional bits. As an example of a straightforward code, a bit indicating whether a pixel is a video or overlay pixel may be copied to the LSB of both the R, G and B values. The decoder may decode the three bits and select the decoded bit by a majority decision.

As another example, in some embodiments, spatial or temporal filtering may be applied followed by a hard decision. For example, a spatial filter may be applied to received data bits and the final bit value may be designed by comparing the filtered output value to a threshold. This may exploit the fact that overlay is typically provided in blocks and that individual pixels are rarely graphic content unless a relatively large number of pixels in the neighborhood are also graphic content. The approach may for example prevent that a single pixel within a menu or subtitle is erroneously detected to not be an overlay pixel and accordingly is boosted to high brightness. Thus, the approach may reduce the risk of e.g. extremely bright individual pixels within a subtitle or menu (or dark pixels within a very bright image object).

In some embodiments, the dynamic range adaptation for a given pixel may be dependent on the value(s) A for a plurality of pixels in a neighborhood of the given pixel. This may for example be achieved by the dynamic range mapping used by the dynamic range adaptation being a function of a plurality of values A (of neighbor pixels) or e.g. by applying a spatial filter as described above.

In some embodiments, the dynamic range adaptation may be arranged to restrict the difference in the dynamic range adaptation between neighbouring pixels. For example, rather than a hard decision of whether to select a first or second dynamic range mapping depending on whether the pixel is designated a video or overlay pixel, the actual dynamic range mapping may be determined as a weighted combination of the two dynamic range mappings with the weights being restricted to only vary by a given amount between neighboring pixels.

In some embodiments, the adapter 71 may be arranged to determine a suitable dynamic range mapping for a plurality of pixels. For example, the dynamic range mapping may be applied in groups of four or 16 pixels with the selected dynamic range mapping being dependent on the merging property for all pixels. For examples, if more pixels within a block are indicated to be video pixels than overlay pixels, then a video dynamic range mapping is applied and otherwise an overlay dynamic range mapping is applied.

In some embodiments, the inclusion of the bits indicating the merging property is performed following at least some of the vide encoding. For example, in some embodiments, perceptual lossy video encoding is first performed (e.g. based on spatial frequency transform) followed by an lossless encoding of the resulting bits (e.g. using run length coding). In such an example, the LSBs of the lossy video encoding output may be substituted by bits indicating the merging property. This may allow efficient encoding without the risk of the encoding introducing errors to the merging property information bits.

In some embodiments, at least one of the values A indicates the degree of merging of video and one or more overlays.

In some embodiments, the adaptation parameters, i.e. how the image pixels are adapted before display, is dependent one more than one parameter provided in more than one of the LSBs in one or more of the color components, such as e.g. in the two least significant bits of three components.

In an exemplary video processing system (henceforth referred to as a VPS), such as e.g. a set top box or a BD player or a portable computer etc., wherein video can be merged with one or more overlays, a video/overlay pixel indication (A) is encoded in one or more of the least significant bits of one or more of the pixel color components in the video signal. The video signal is transmitted over the interface between the VPS and a display. The display applies dynamic range adaptation to the image(s) of the video signal. This adaptation is performed in dependence on the video/overlay pixel indication (A).

The approach may be used in various configurations and using various (color component) formats, such as e.g. (non/limiting) RGB 4:4:4, YCbCr 4:4:4, YCbCr 4:2:2, YCbCr 4:2:0.

The number of bits available for each color component may vary between different embodiments, e.g. there may typically be 10, 12, 16 bits per component. Most commonly 10 or 12 bits are used for video signals although 16 bits may have some use, albeit predominantly for luminance values. 8 bit values are also possible in many systems but are typically considered to be too low for HDR (it is more typically used for legacy equipment, e.g. for 8 bit MPEG video).

In some embodiments, an apparatus in accordance with an example of e.g. one of FIGS. 1-7 may be arranged to communicate the merged video signal 6 in accordance with a video signal format. For example, the apparatus may communicate the merged video signal 6 over an HDMI cable, i.e. in accordance with an HDMI format. In some such embodiments, the number of bits used to represent the color component values of the image may be smaller than a number of bits allocated to each color component by the video signal format. In such a case, the bits of the color component values may be allocated to some of the bits allocated to the component values by the video format and bits indicative of the one or more values (A) indicating the merging property for the pixel may be provided (inserted/embedded) into some bits allocated to the color component values by the video signal format but not used by the color component values. In this way, communication of the values indicative of the merging property may be communicated without affecting the actual image information. Thus, no degradation or artefacts need be introduced in order to support the additional functionality.

For instance, if the source video has a bit-depth of 10 bits and the merged video is transmitted from the VPS to the display in a 12 bit mode, 2 LSB per component can be used to convey the video/overlay information without any degradation being introduced. If the pixel configuration is RGB or YCbCr 4:4:4 with 12 bits per component, 6 bits per pixel are available. If the configuration is YCbCr 4:2:2, it may be taken into account that the CbCr values are shared among 2 pixels, leaving 4 bits per pixel for the video/overlay indicator.

For example, if the YCbCr output pixel uses 10 bits per component, the least significant bit of the Cb or Cbr component (or less likely the Y component) could e.g. be used to indicate that at least one of the T values (transparency values) of the merger input pixels has a value different from zero. Alternatively, this LSB could be used to indicate that both values of T were below a certain threshold.

In another example, multiple bits of the output of the merger are used, e.g. the LSB of Cb and the LSB of Cr, or the LSBs of all three components may be used. Multiple bits could be used to differentiate between various merging levels. With two bits four levels can be distinguished, e.g. one value (1) could indicate no merging, another value (2) could indicate 75% video and 25% overlay, a third value (3)

could indicate 50% video, 50% overlay, and a fourth value (4) could indicate 100% overlay. With more bits, a more precise indication of the contribution of the graphics overlay in the output levels can be achieved.

Typically the number of bits per component in an interconnect format (HDMI, Display port etc) are 8, 10, 12 or 16 bits. If the video source is coded with 10 bits per component, it is thus possible to use 6 (12 bits output) or even 18 bits (16 bit output) to transmit merging information, such as the transparency level that was locally applied for the pixel. One option would be to apply the 12-bit output mode and steal 3 LSB bits from each of Cb and Cr components and 2 bits from the Y-component. In that way, 8 bits would be available to transmit the merging level.

Instead of the YCbCr output mode, the RGB output mode could be used in a similar way.

In the above examples, it is assumed (in some embodiments) that the spatial resolution of each component is equal. This is called YCbCr 4:4:4 or RGB 4:4:4. However, in many cases subsampling of the color components is applied. In the case of YCbCr 4:2:2, the color components are spatially subsampled by a factor of 2 in the horizontal direction only. In the case of YCbCr 4:2:0, the color components are spatially subsampled by a factor of 2 in both directions. It may in some embodiments be beneficial to keep the full resolution for the merging indication bits. Therefore, for each LSB that is used to indicate merging information, a clear assignment may be provided as to which pixel location the bit applies. E.g. in the 4:2:2 case, the LSBs of Cb components may relate to graphics overlay for the odd pixels, while the LSBs of Cr components may relate to even pixels.

Another option to reduce the number of bits needed is to transmit a merging bitmap (providing indications of the merging property, i.e. A values) at a lower resolution than the video resolution. E.g. if the video resolution is 1920×1080, the merging bitmap resolution may be for instance 960×540. For example in the YCbCr 4:2:0 case the LSBs of the Cb and the Cr components could be used to indicate the merging level for pixel locations that apply for the Cb and Cr components. Thus, in some embodiments, one or more A values may apply to a plurality of pixels, and specifically may apply to a group or area of pixels.

Signaling of which merging indication bit configuration is used across the interface may be indicated in a metadata channel also used for the dynamic range adaptation data. With reference to FIG. 7 this means that signal 55, providing dynamic range adaptation parameters and signal 56, providing information on which LSBs of which components are used for indicating the merging property (often whether and/or to what extent a pixel is a mix of video and one or more overlays) may be done in the same metadata channel.

The signal 56 may also provide some statistical or general information such as for instance whether or not any subtitles are used.

As shown above, in the display the merging property indication bits may be used to decide on a per pixel basis if, and possibly also to what extent, the dynamic range adaptation is applied.

If there is only one bit per pixel (indicating that the pixel is an overlay pixel or video pixel), the dynamic range adaptation intended for the original video could switch between full (no overlay) or limited (overlay). Limited could mean that no adaptation is applied at all, as in the example of FIG. 8, or only to a certain extent. If there are multiple bits indicating e.g. a merging level value per pixel, the display may apply dynamic range adaptation by scaling the amount of adaptation depending on the merging level. The scaling may have a linear relation with the merging level or a non-linear function may be applied to optimize the perceived picture quality.

Figure 15:
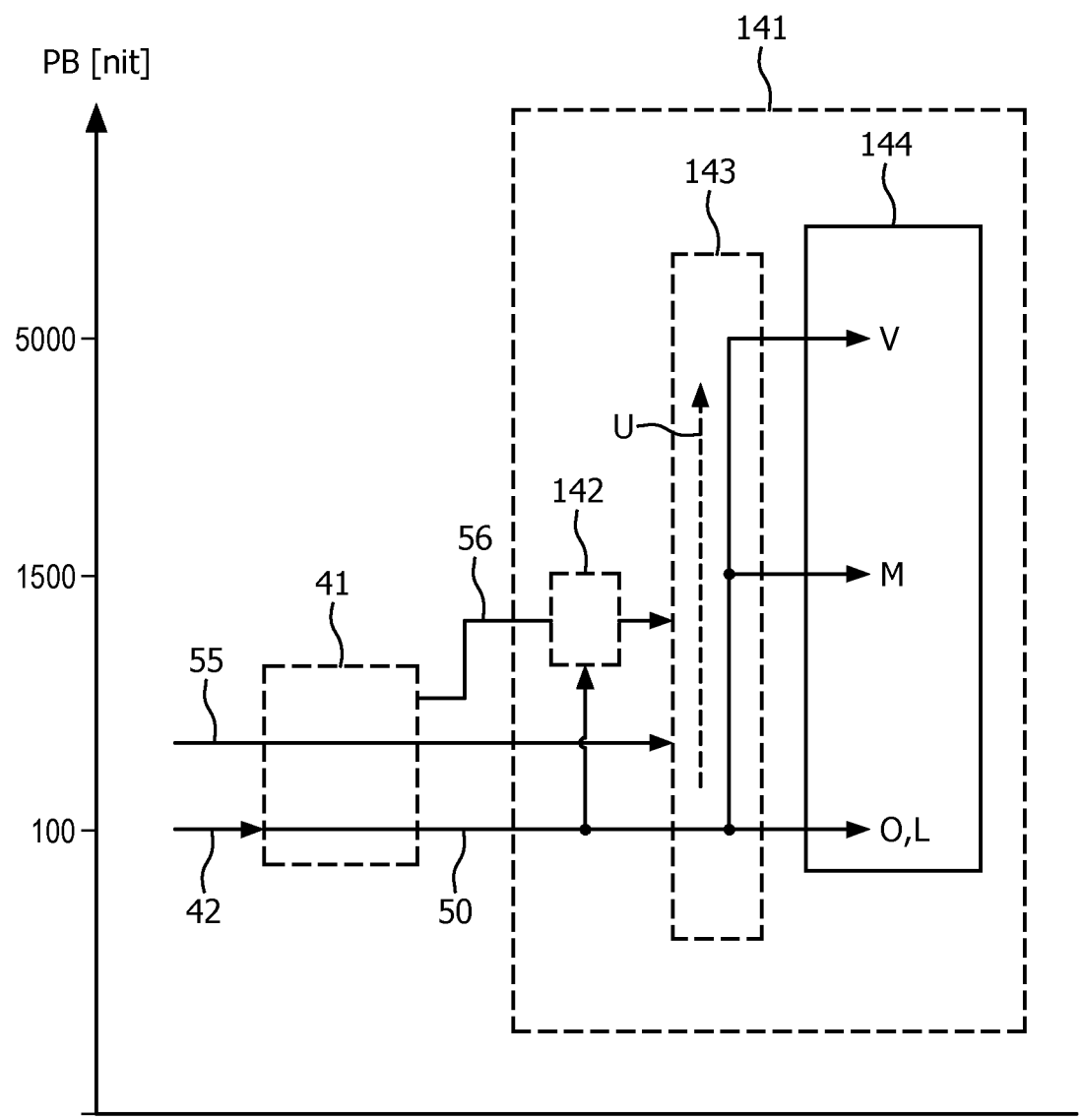
FIGS. 15 and 16 show examples of a combination of encoding in a VPS and decoding in a TV in accordance with some embodiments of the invention.
Figure 16:
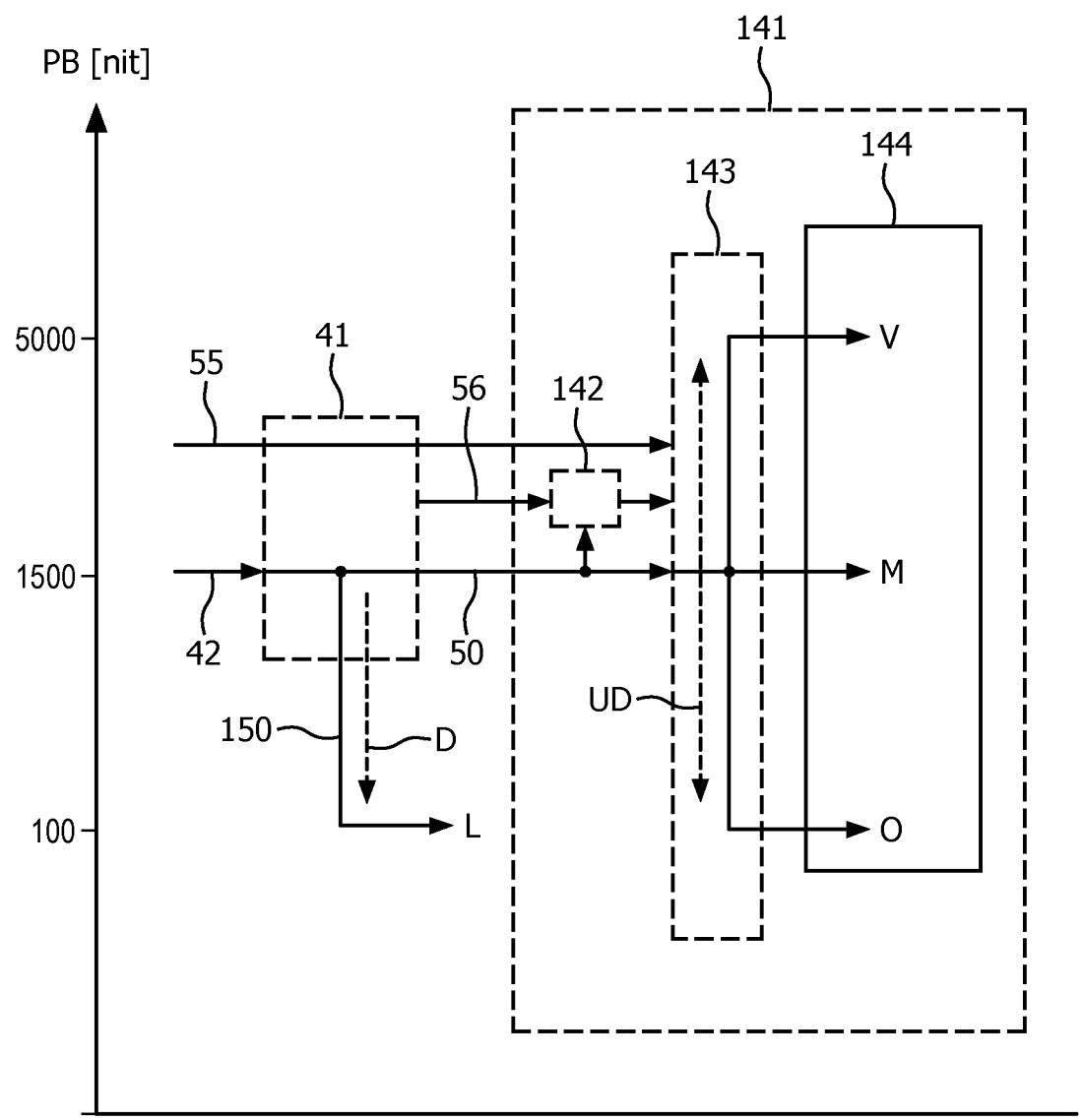

FIGS. 15 and 16 show embodiments of a combination of encoding in a VPS and decoding in a TV.

In FIGS. 15 and 16 an incoming signal 42 is received by the VPS 41. The vertical axis illustrates the peak brightness PB or peak luminance (white point) for which the signal is graded, i.e. for which the images of the received video signal has been graded, e.g. by a manual color grading. The signal 42 is in the example an LDR signal graded for a PB of 100 nit, and is for instance derived from an original HDR signal graded for 5000 nit. Thus, although an LDR optimized image, it also represents an HDR image and thus is an HDR image representation. Together with the signal 42, a signal 55 is provided (as in FIG. 6) providing information on how to upgrade the signal to higher values for the peak brightness, or in other words how to apply dynamic range adaptation to the images of the video signal 42. The signal 55 is passed on by the VPS 41. In the VPS 41, merged signal 50 is produced with one or more LSBs of one or more color components comprise information on a merging property and specifically on the type and merging parameters for a pixel. Furthermore, signal 56 is provided, which provides instructions on which LSBs are filled with which merging information, such as the type and merging parameters for a merged pixel. Thus, the signal provides information on the encoding of the merging property. The horizontal axis illustrates various steps in manipulation of a signal and the components that are used in such steps.

The signals 50, 55 and 56 are received at an input of a TV 141. The TV 141 comprises a decoder 142 and a dynamic range adapter 143. The decoder is instructed via the signal 56 of which LSBs of which components comprise which information, i.e. it is informed of how the merging property is encoded. The decoder decodes the information on said LSBs and then sends the information to the dynamic range adapter 143, e.g. specifically telling the dynamic range adapter the type of the pixel (i.e. whether it is video and/or overlay or a mix) and, when appropriate what the mix is.

The dynamic range adapter 143 is provided with information from signal 55, which enables the adapter to upgrade the incoming LDR signal. The merging type information and or merging information coming from decoder 142 is used in dynamic range adapter 143 to dynamically adapt pixels wherein, as an example, an overlay pixel is kept at a 100 nit grading, for a pixel belonging only to video the dynamic range is adapted to 5000 nit, while for a mixed pixel (i.e. comprising both video and overlay) the dynamic range is adapted to 1500 nit. The dynamic range adaptation is schematically indicated in FIG. 15 with the arrow U for upgrading. The net result for a video pixel is denoted by the letter V, for an overlay with O, for a mix with M, and for a legacy TV, which has no means for performing dynamic range adaptation with L. The so generated pixels values are sent to a display 144 for being displayed.

FIG. 16 illustrates a variation on the set-up of FIG. 15. In FIG. 16 the incoming signal 42 is an HDR signal which in the specific example is graded for a maximum brightness of 1500 nit. The signal 55 comprises information on how to grade, i.e. perform a dynamic range adaptation, this signal 42 to higher peak brightness, such as for instance a 5000 nit peak brightness. It also includes information on how to grade the signal to lower peak brightness, for instance to a peak brightness of 100 nit.

The difference with respect to FIG. 15 is that in the example of FIG. 16, the decoder plus dynamic range adapter may increase (upgrade) as well as decrease (downgrade) the dynamic range for a pixel. For that reason the arrow U, for Up, of FIG. 15 is denoted UD, for Up or Down, in FIG. 16.

Also, to provide a signal that is directly useable for legacy TV's the VPS (or a device in between the VPS and the legacy TV) provides a signal 150 which is derived from the merged signal after a dynamic range adaptation to reduce the dynamic range. This downgrading is denoted by the arrow D. The VPS 41 uses the information in signal 55 for the dynamic range adaptation of the output signal L. This signal L is then fed to the input of a legacy TV for display on a legacy TV display.

The incoming signal may in other examples also be e.g. a signal graded for the highest possible peak brightness, (e.g. 5000 nit), in which case the display may perform dynamic range adaptation to reduce the range to a specific peak brightness of the display (being below 5000 nit).

Figure 17:
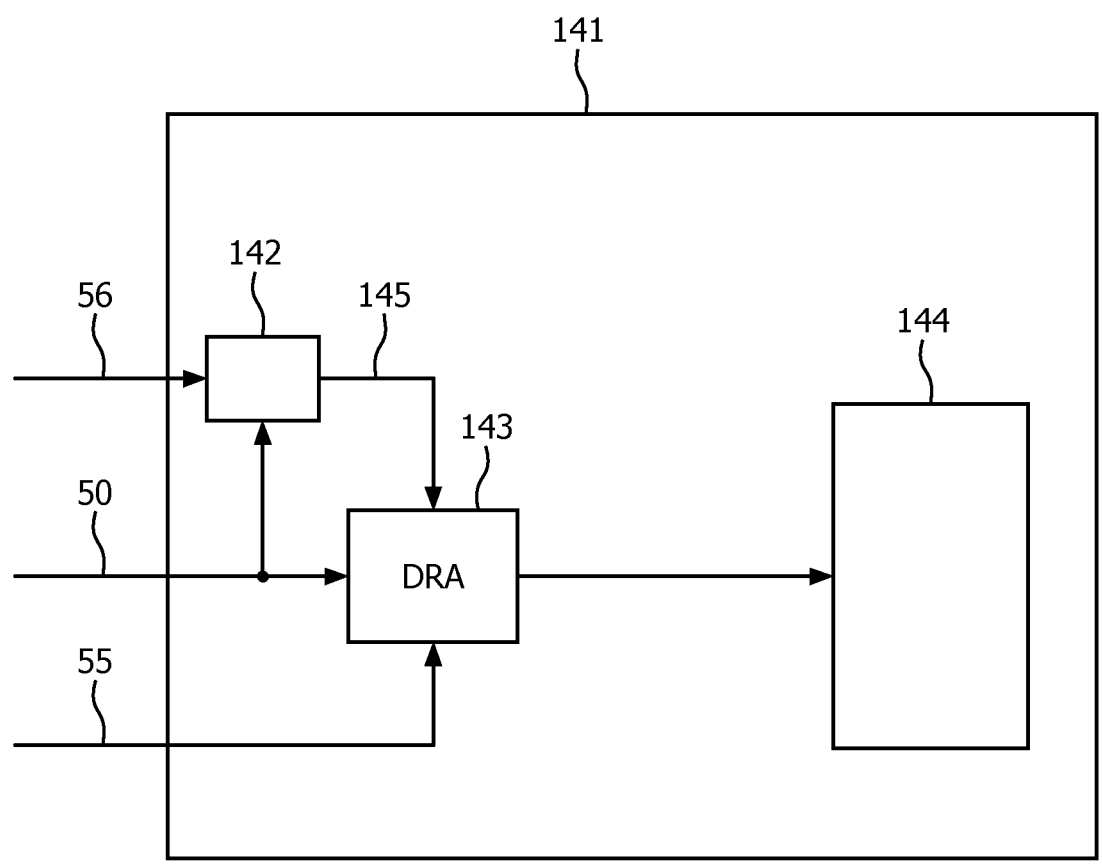
FIG. 17 illustrates a display comprising functionality in accordance with some embodiments the invention.

FIG. 17 shows more in detail an embodiment of a display device, such as a TV, in accordance with some embodiments of the invention. The merged signal 50 is provided to the dynamic range adapter 143 and to reader 142. The reader 142 reads one or more LSBs and provides a signal 145 based on the reading of the content of said LSBs. This signal comprises the values A indicating the merging property, such as specifically the merging type and/or merging parameters for the pixel. This constitutes a decoding of the information that was put in the signal 50 by the encoder 51 in the VPS 41 of for example the system of FIG. 7.

The reader 142 may be provided (as in the specific example) with a signal 56 informing the reader 142 of which LSBs contain which information, and in which manner the encoding has been performed, or in other words it provides the decoding scheme. Thus, the reader 142 may be provided with a signal indicating how the merging property has been encoded in the signal.

The dynamic range adapter thus receives merged signal 50 and signal 145 providing information on the merging property, such as the merging type and/or merging parameters of pixels.

In this embodiment, the dynamic range adapter 143 is also provided with signal 55, which indicates parameters for the dynamic range adaptation, i.e. it may provide information on how to adapt the dynamic range.

The information from signals 50, 55 and 56 is used for dynamic range adaptation. If e.g. encoding formats or dynamic range adaptation approaches are known in advance, one or more of the signals 55 and/or 56 may not be utilized.

For instance, if a standard has been agreed dictating which LSBs comprise which information, signal 56 need not be generated, sent and received, since at both the encoder and decoder side a known standard is followed.

Figure 18:
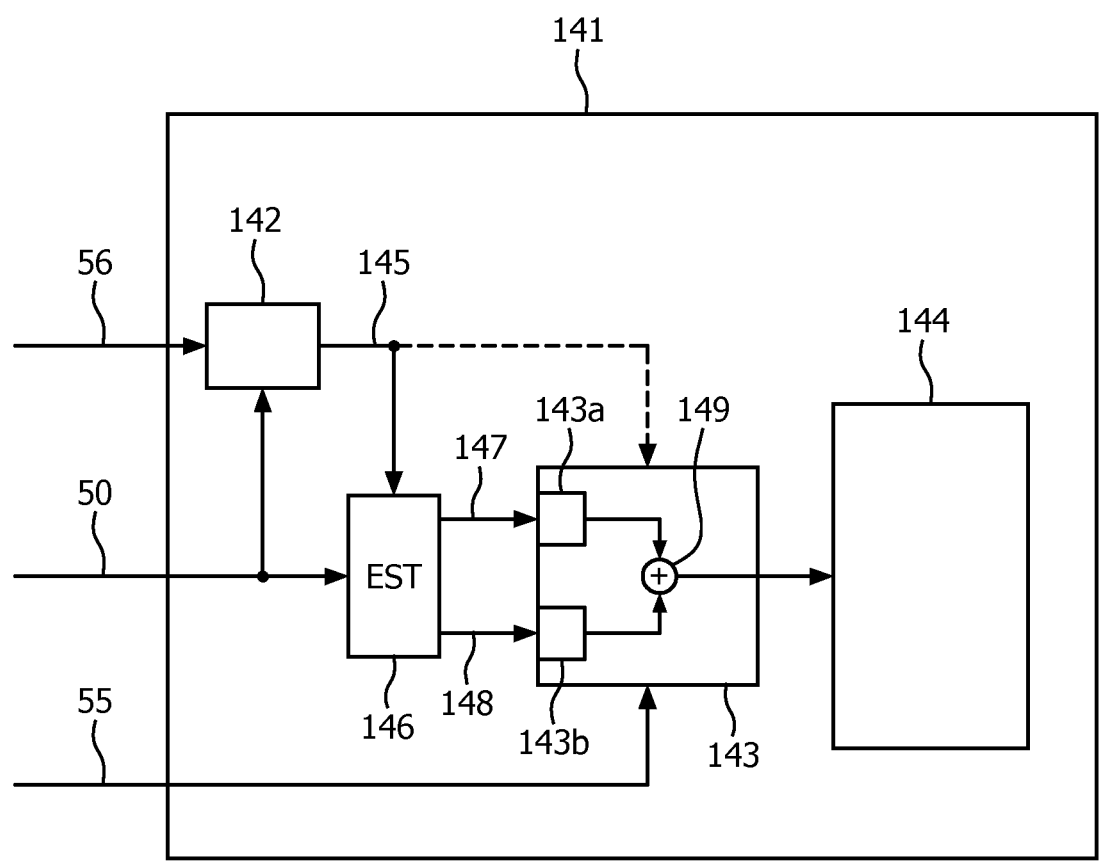
FIGS. 18 and 19 illustrate illustrates an example of aspects of some embodiments of the invention.
Figure 19:
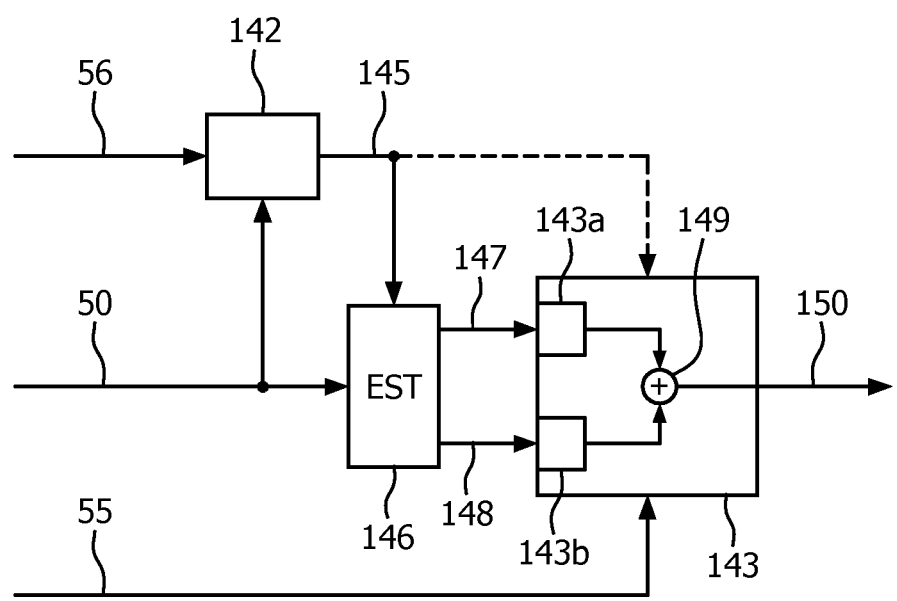

FIGS. 18 and 19 illustrate a further embodiment of the invention.

A linear or non-linear interpolation based on provided mixing parameters, as given in examples above, is one possibility for dynamic range adaptation for incoming pixels that are comprised of a mix of video and graphics, such as for instance subtitles.

In another embodiment a different approach is used.

If it is known that a pixel is composed of video as well as graphics, such as a subtitle, it is known that a mixed signal is provided, but it is not unambiguously known which part of the pixel values for different colors in the merged signal was originally video and what part is originally subtitle.

The mixing parameters, for instance indicating that 25% is subtitle and 75% is video, provide some guidance, but a more accurate determination may be useful.

Even if one knows the percentage, the true contribution of an overlay may be in a margin around 25%, and furthermore since the color of the subtitle and the color of the video are not known, it is unknown what the contribution of video and subtitles is at various colors.

In some embodiments, in the decoder, for pixels for which one or more of the lowest bits indicate that they are comprised of video and one or more overlays (and thus form a "mixed pixel"), an estimation is made of the contribution to the pixel values of the graphics (such as subtitles) and video in various colors.

This is for instance done by analyzing the pixels surrounding a pixel.

For the collection of pixels, i.e. the pixel and its surrounding pixels, the mixing parameters are known or at least it is known that there is a mix or a possible mix.

What is not known is what the contributions are for different colors.

For instance, the video may be red and the subtitles may be green.

The mix between overlay and video may as an overall be 50% of each for the pixel, but the in mix ratio in the individual colors may vary substantially from this (as the chromas of the video and overlay may be very different for the pixel).

By analyzing a pixel and its surrounding pixels, an estimate can be made of the contribution of the graphics and of the video to the signal for said pixel.

Some mixing parameters may be provided in the LSBs of some of the color components, and often graphics such as subtitles typically have a more or less constant color and intensity and possibly even size and form. This may allow an estimation of the individual contributions.

Thus, the incoming (for instance LDR) mixed signal is used to provide, by an estimator using the incoming mixing parameters and an analysis of a pixel and the surrounding pixels, an estimate of the graphics contribution and an estimate for the video contribution to the incoming signal. If the video signal is for a white spot and the subtitle is green, then by comparing a pixel that is 100% video with a neighboring pixel that is 50% video and 50% subtitle, one can estimate the contribution in the various color components of the subtitle by comparing the mentioned pixel values. The fact that subtitles are often of more or less constant color and intensity, and often of more or less standard size and form, can of course be used in the analysis. In the analysis, the data for said pixel and for a number of surrounding pixels are for instance compared. In some embodiments, a single neighboring pixel can be used for the analysis, but using more than one of the surrounding pixels in the analysis typically yields better results.

Subtracting the estimated subtitle contribution from the signal provides for the estimated video contribution to the merged signal and vice versa.

To the so estimated signals a dynamic range adaptation may then be applied individually to the individual estimated signals.

This can for instance be a full dynamic range adaptation being applied to the estimated video signal and a fixed value or a different dynamic range adaptation being applied to the estimated overlay signal.

The dynamic range adaptation may also use some extrapolation as described in previous examples.

The advantage of such an embodiment is that more detailed information on the contribution of graphics and video to color signals is established and used to individually optimize the individual features.

This allows better fine tuning of the dynamic range adaptation.

FIG. 18 illustrates an example of such an embodiment:

An incoming mixed LDR signal is provided to an estimator 146 indicated by EST in FIG. 18.

This estimator is also provided with information signal 145 by reader 142, so it knows where there are mixed pixels and in embodiments also an indication of the amount of mixing. Estimator 145 knows where there are mixed pixels and may have some further general information.

The estimator analyses the data of the pixels and surrounding pixels to provide a graph estimation signal 147 and a video estimation signal 148. For instance, the signal 147 is an Yuv_graph_estimate signal, i.e. a Yuv signal giving an estimate of the subtitle contribution alone in the incoming LDR signal.

Signal 148 is an Yuv_video_estimate signal, i.e. a Yuv signal giving an estimate of the video contribution alone in the incoming LDR signal.

On these signals 147 and 148 a dynamic range adaptation is performed with the dynamic range adaptation being different for the two signals. This is schematically indicated in FIG. 18 by the numbers 143a and 143 b. Signal 55 may provide instructions on the to perform the dynamic range adaptation. At least one of the signals 147 and 148 is adapted, but often and preferably both.

The adapted signals are remixed in mixer 149, in FIG. 18 schematically indicated by the + sign. The estimated subtitle signal 147 can for instance be boosted somewhat less than the estimated video signal 148; in the remixed signal the subtitles are then less prominently visible.

The resulting signal for display 144 may for instance be T_2*Yuv_graph_estimate signal+(1−T_2) *K*Yuv_video_estimate where K is a boosting factor for the Yuv_video_estimate.

In this example the video estimate signal is boosted, while the overlay estimate signal is maintained at its LDR value. The adapted signals are then remixed with a remixing parameter T_2. The remixing parameter T_2 may be provided by signal 55.

In this embodiment, the decoder comprises an estimator which estimates the contribution in different colors of overlay and video based upon an analysis of a pixel and its surrounding pixels.

The same information may, in embodiments, also be provided in LSBs of the incoming signal 50 itself. For instance, one LSB in one component may indicate whether a pixel is video or some sort of mix, and 3 bits in each component may indicate the contribution of the video to the total signal for said component.

However, this requires considerably more LSBs to be used and it furthermore may in many implementations requires the encoder to compare the signal after merging with the signals before merging. However, this may be justified by an improved adapted image being guaranteed.

In the embodiment, the reader 142 provides information on the contributions to the various colors in signal 145 and the estimator 146 can simply use the provided data directly to generate an estimate of the contributions of respectively video and overlay. The estimator may in this case not need to perform an analysis using data of a pixel and surrounding pixels, rather all information may be supplied in the signal 145, read by reader 142 from LSBs of the incoming signal 50.

The resulting signals may still be estimates (or at least have some quantisation error), since the number of bits available is inherently limited, and thus the signals leaving the estimator can be considered estimates of the original merging.

Using an analysis based on the surrounding of a pixel may in some embodiments and applications be preferred since less LSBs are needed for providing merging information and a higher accuracy can often be obtained.

FIG. 19 shows a detail of the display device of FIG. 18. In this example, the decoder is shown, with the incoming signals 50, the merged signal, 55, the information on dynamic range adaptation 56, the information on which LSB are used and how, and the outgoing signal.

In the example of FIG. 18, the decoder is thus arranged to estimate the original overlay and video signals that were merged at the encoder. Dynamic range adaptation may then be applied individually to these estimated signals, and specifically the dynamic range mapping applied to the estimated video signal (the images) may be different to that applied to the estimated overlay signals. In some embodiments, a plurality of overlay signals may be estimated, i.e. the merging may be (assumed to be) performed with a plurality of input overlay signals being combined into the merged video signal 6 (together with the video signal). In such scenarios, the decoder may estimate a plurality of overlay signals and may perform different dynamic range adaptations to the different overlay signals. For example, for a white overlay signal, no brightness boost may be applied whereas a relatively small brightness boost is applied to the e.g. a green overlay. A different and e.g. more aggressive dynamic range adaptation may be applied to the video signal.

In such an approach, the decoder accordingly seeks to reverse the merging performed by the merger of the encoder. Indeed, the decoder seeks to generate estimates of the original signals, i.e. of the video and overlay signals. If this is achieved, dynamic range mappings that are optimal for the individual content type for the specific display can then be applied. Following such individual dynamic range mapping (optimization), a merged dynamic range adapted video signal can be generated and presented.

In essence, by reading the information in one or more of the LSBs the pixels that are merged pixels are identified, and e.g. the degree of merging/mixing is determined. Using information available in surrounding pixels, the original constituents of the signal are reconstructed (e.g. assuming a low frequency characteristic of the video, or using more complicated co-estimation models), or more precisely they are estimated. Knowing what was merged, and knowing the original grading and the grading of the display, allows for a further improved adaptation.

Figure 20:
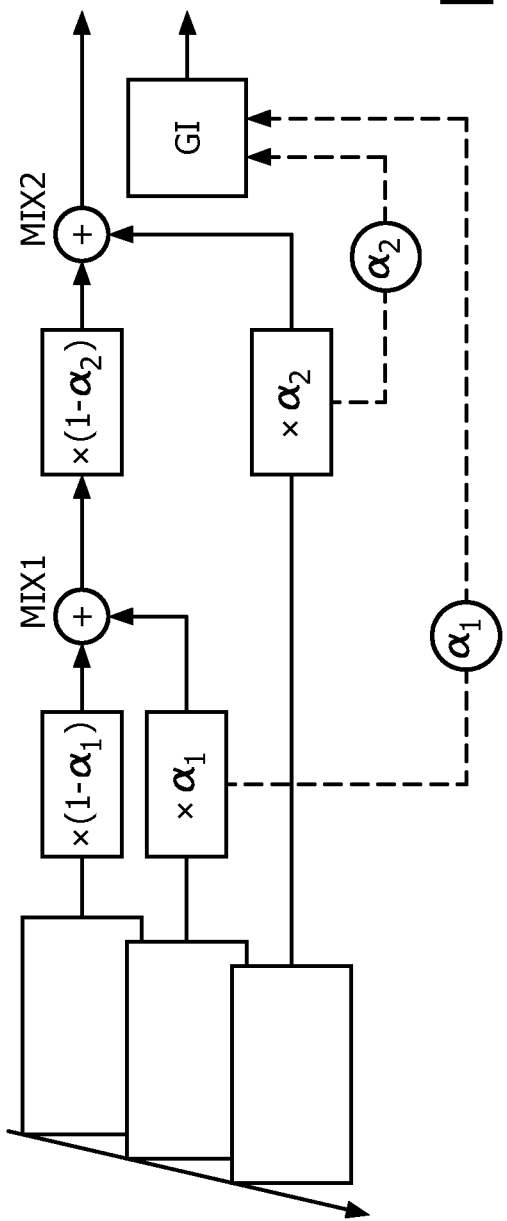
FIGS. 20 and 21 illustrate some examples of generating indications of a merging operation FIG. 22 illustrate examples of possible dynamic range mappings.

The value A indicating the merging property may be referred to as a the Graphics Indicator bit which is generated and transmitted for each output pixel. This bit may be embedded in the video output signal. Specifically, a lowest one of the luma bits (i.e. least significant bit) can be used for this, as it will typically correspond to luminances so dark that a viewer would not perceive such a graphics coding noise. E.g. a bit value of "1" could be graphics, and "0" could be normal video (i.e. in the merging only video). As a specific example for a BD system, the approach may be used when in the HDMV mode. In this case, the Graphics Indicator bit IG may be generated for each pixel as a function of α1 and α2 applicable for that pixel. IG may be set to 1b if any of α1 and α2 have a value greater than 0.06, otherwise IG may be set to 0b. See also FIG. 20.

Figure 21:
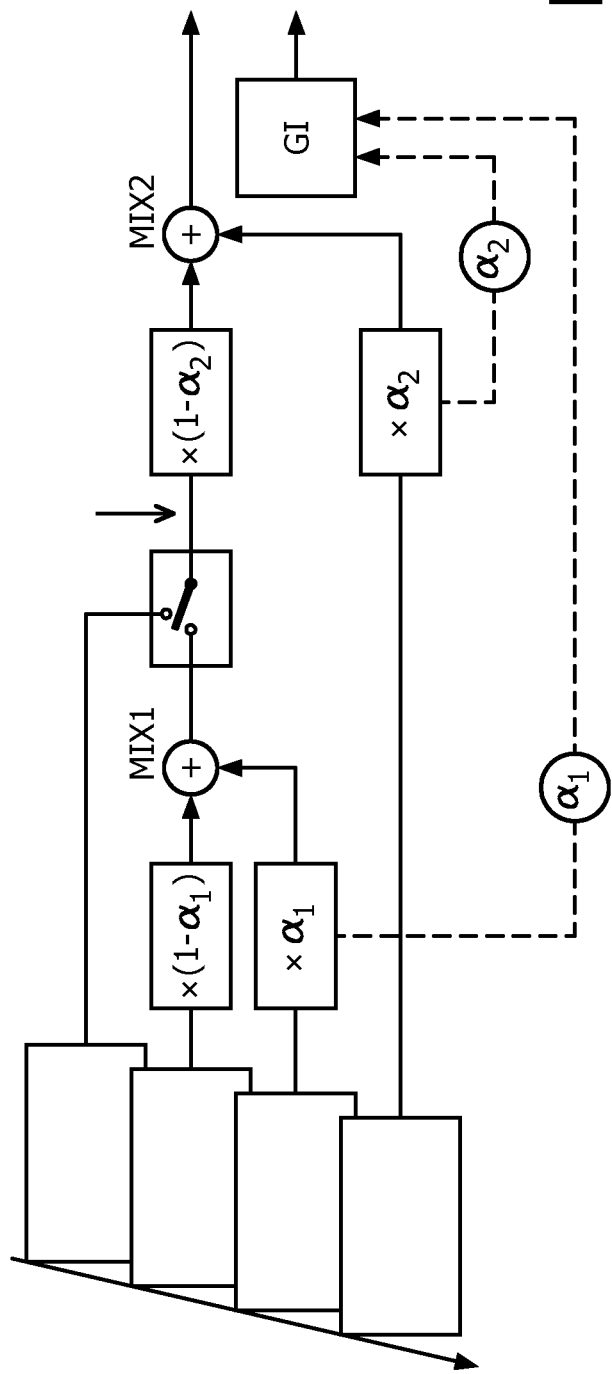

When in BD-J mode, the Graphics Indicator may be generated as illustrated in FIG. 21. In this case, the Graphics Indicator bit shall may be set to 1b for all pixel locations for which the Background plane pixel is set in the interim video data. For all other pixel locations the Graphics Indicator bit may be generated in the same way as it is generated in HDMV mode, except that in the BD-J graphics case α2 is extracted directly from the pixel data.

In some of the above examples the word TV has been used, this word stands for any display device that comprises a display; it could be a screen of a home computer, or of a home video system, or of a tablet or any portable display device, At present HDR devices are often used at home, but this is not to be considered a restriction for the invention. HDR displays may be used in many devices of various types.

The term "graphics" may be used to indicate a general type of overlay such as subtitles or menu or other overlays.

An overlay may be any additional signal that is merged in a merger to an image video signal.

The term "color" should not be interpreted to only refer to chroma values or properties but rather may also include luminance, or indeed may only refer to luminance. For example, a color grading may be a luminance grading only where chroma is not considered.

The terms color grading/tone mapping/dynamic range adaptation may be considered to be equivalent (as indeed is in accordance with their use in the field).

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" or similar words such as 'device' in this application is used in its broadest sense, namely a group of means allowing the realization of a particular objective, and can hence e.g. be (a small part of) an IC, or a dedicated appliance (such as an appliance with a display), or part of a networked system, etc. "Arrangement" "system", or similar words are also intended to be used in the broadest sense, so it may comprise or be formed in inter alia a single apparatus, a part of an apparatus, a collection of (parts of) cooperating apparatuses, etc.

A computer program product version of the present embodiments as denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product. It should be clear that with computer we mean any device capable of doing the data computations, i.e. it may also be e.g. a mobile phone. Also apparatus claims may cover computer-implemented versions of the embodiments.

Some of the steps required for the operation of the method may be already present in the functionality of the processor instead of described in the computer program product, such as data input and output steps.

Based on the previous descriptions, it will be appreciated that the following approaches may be supported by the description:

There may be provide a method for encoding a video signal comprising adding to an input video image signal (2) one or more overlay signals (3, 4) to form a merged video signal (6, 50), generating one or more values (A) indicating for a pixel in the merged video signal a merging type and/or one or more merging parameters and encoding for said pixel said one or more values (A) in one or more least significant bits from one or more color components of the merged video signal (6, 50)

Optionally, for such a method, at least one of said one or more values (A) indicates the merging type of said pixel.

Optionally, at least one of said one or more values provides a merging parameter indicating the amount of merging of the input video signal and one or more overlay signals for said pixel.

Optionally, a single least significant bit is used for indicating whether the pixel is video, or overlay signal or a merge of video and one or more overlay signals.

Optionally, the number of least significant bits indicating the merging type and/or one or more merging parameters in the merged video signal is variable, and indicated by a coding length signal.

Optionally, to the merged video signal an information signal (56) is provided comprising information on which least significant bits are used for indicating the merging type and/or one or more merging parameters in the merged video signal (50) for said pixel and/or how said least significant bits are used to indicate a codification method.

There may be provided a video processor for encoding a video signal comprising a merger (5, 51) for merging an input video image signal (2, 46, 48, 54) and one or more overlays signals (3, 4) to form a merged video signal (6, 50), and an image encoder (7, 51) for generating or receiving one or more values (A) indicating for a pixel in the merged video signal the merging type and/or one or more merging parameters and for encoding for said pixel said one or more values (A) in one or more least significant bits from one or more color components of the merged video signal (6, 50).

Optionally, for such a video processor, the encoder is arranged for encoding at least one least significant bit with a value indicating a merging type for said pixel.

Optionally, the encoder is arranged for encoding at least one value providing a merging parameter indicating the amount of merging of video and one or more overlays.

Optionally, the encoder is arranged for providing to the merged video signal an information signal (56) with information on which least significant bits are used for indicating the merging type and/or one or more merging parameters in the merged signal for said pixel and how.

Optionally, the merger (5) is arranged for providing a merging information signal (MIS) to the encoder (7).

The video processor may be comprised in a set top box or BD player.

There may be provided a method for decoding a video signal wherein a video signal merged from more than one signal is received, for a pixel one or more of the least significant bits of one or more of the color components of the video signal are read and from said least significant bits one or more values (A) are generated and wherein said pixel of the received video image signal is subjected to an adaptation prior to display, wherein the adaptation is dependent on the generated value (A) or values.

Optionally, the adaptation comprises a step of applying a dynamic range adapting color transformation.

Optionally, at least one the values A indicates a merging type for the pixel and the adaptation prior to display is dependent on the merging type of the pixel.

Optionally, at least one of the values (A) represent whether or not a pixel is video or overlay and/or a mixture of video and overlay.

Optionally, at least one of the values indicates an amount of merging of an image video signal and one or more overlay signals and the adaptation prior to display is dependent on the amount of merging.

Optionally, a single least significant bit is read to obtain the value (A).

Optionally, prior to adaptation the video signal is split into more than one estimated signal estimating the more than one signals prior to the merge, based on an estimate of contribution of video and overlay to a pixel value of the signal, whereafter at least one of the signals is color transformed to adapt its luminance, and the adapted signals are remixed.

Optionally, the splitting of a signal for a pixel is based on an analysis of the data for said pixel and data for a number of surrounding pixels which are identified as non-mixed video pixels.

There may be provided a video decoder for decoding a video signal merged from more than one signal comprising an input for receiving a video signal, a reader (72) for reading at least one or more least significant bits for one or more color components of the video signal for a pixel and generating one or more values (A) from the read least significant bits and an adapter (71, 143) for adapting the video, and wherein the adapter is arranged for adapting a pixel value in dependence on the generated value or values (A).

Optionally, the video decoder comprises an input for a signal (56) with information on which least significant bits to read and how to convert them to the values (A).

Optionally, the adapter is arranged for performing a dynamic range adaptation on the image pixels.

Optionally, the reader is adapted to read a single least significant bit to obtain (A).

Optionally, the system comprises an estimator (146) for splitting the received video signal into more than one estimated signal (147, 148), based on an estimate of contribution of image video and overlay to a pixel value of the signal, at least one of the signals is adapted, and comprising a mixer (149) for remixing the adapted signals.

The invention claimed is:

1. An apparatus for decoding an HDR video signal merged from more than one source signal, the apparatus comprising:
    a reader device having an input for receiving the HDR video signal, the reader device for (i) reading at least one or more least significant bits of one or more color components of the received HDR video signal for a pixel and (ii) generating one or more values from the read at least one or more least significant bits, wherein the generated one or more values indicate a merging property for the pixel, the merging property being indicative of a property of a merging in the received HDR video signal of one or more overlay signals with a video image signal for that pixel; and
    an adapter device, communicatively coupled to the reader device, for adapting, via one or more dynamic range adaptation, a pixel value in the received HDR video signal in dependence on the generated one or more values that indicate a-said merging property for a respective pixel, the adapter device having an output for outputting an adapted HDR video signal, in which (i) a dynamic range adaptation of video image pixels merged with one or more overlay in the received HDR video signal is different from (ii) a dynamic range adaptation of non-merged video image pixels in the received HDR video signal, to be rendered on a display device.

2. The apparatus of claim 1, wherein the reader device further having an input for receiving a signal including information (i) on which least significant bits of the one or more color components of the received HDR video signal for a pixel to read and (ii) how to convert corresponding read least significant bits to the one or more values that indicate said merging property for said respective pixel.

3. The apparatus of claim 1, wherein the adapter device is arranged to perform the one or more dynamic range adaptation on image pixels of the HDR video signal.

4. The apparatus of claim 3, wherein the adapter device is further arranged to adapt a mapping from an input dynamic range of the HDR video signal to an output dynamic range for a pixel in dependence on the one or more values that indicate said merging property for said respective pixel.

5. The apparatus of claim 4, wherein the one or more values is indicative of a percentual contribution to said respective pixel from the video image signal relative to a percentual contribution from one or more overlay signals; and wherein the adapter device is further arranged to apply a different mapping for different percentual contributions.

6. The apparatus of claim 1, further comprising:
    an estimator having an input for receiving the HDR video signal, the estimator for splitting the HDR video signal into a plurality of estimated signals, based on an estimate of a contribution of (i) the video image signal and (ii) one or more overlay signals to pixels of the HDR video signal, and
    wherein the adapter device, communicatively coupled to the estimator, further comprises a mixer for remixing the plurality of estimated signals following an adaptation by the adapter device, wherein the adapter device is further arranged to separately adapt, via the one or more dynamic range adaption, at least one of the plurality of estimated signals.

7. The apparatus of claim 1, wherein the merging property is indicative of a merging type for said respective pixel.

8. The apparatus of claim 1, wherein the merging property for a said respective pixel is indicative of an amount of merging of (i) the video image signal and (ii) the one or more overlay signals for said respective pixel.

9. The apparatus of claim 1, wherein the adapter device is further arranged to, prior to adapting via the one or more dynamic range adaptation, split the HDR video signal into more than one estimated signals estimating at least some of the one or more overlay signals and the video image signal based on an estimate of contribution of the at least some of the one or more overlay signals and the video image signal to a pixel value of the HDR video signal, whereafter at least one of the estimated signals is color transformed to adapt its luminance, and the more than one estimated signals are remixed following adaptation.

10. The apparatus of claim 1, wherein the merging property comprises at least one property indicative that a pixel comprises first overlay content, the first overlay content originating from at least one of (i) an overlay signal that comprises locally generated graphic content or (ii) an overlay signal that comprises a second video image signal which includes merged overlay content.

11. The apparatus of claim 10, wherein the adapter device further adapts pixels within a region for which the merging property is indicative of said respective pixel that comprises first overlay content to have output luminances within a predetermined range.

12. The apparatus of claim 1, wherein the adapter device is arranged to perform (i) a dynamic range adaptation on image pixels of the HDR video signal that are fully original video, (ii) no dynamic range adaptation being applied to pixels that are fully overlay, and (iii) varying degrees of dynamic range adaptation being applied to pixels that are part original video, part overlay, dependent on a ratio of video to overlay.

13. A method of decoding an HDR video signal merged from more than one source signal, the method comprising:
 reading, via a reader device having an input for receiving the HDR video signal, at least one or more least significant bits for one or more color components of the received HDR video signal for a pixel and generating one or more values from the read at least one or more least significant bits, wherein the generated one or more values indicate a merging property for the pixel, the merging property being indicative of a property of a merging in the received HDR video signal of one or more overlay signals with a video image signal for that pixel; and
 adapting, via an adapter device communicatively coupled to the reader device and via one or more dynamic range adaptation, a pixel value in the received HDR video signal in dependence on the generated one or more values that indicate said merging property for a respective pixel, wherein adapting further includes outputting an adapted HDR video signal, in which (i) a dynamic range adaptation of video image pixels merged with one or more overlay in the received HDR video signal is different from (ii) a dynamic range adaptation of non-merged video image pixels in the received HDR video signal, to be rendered on a display device.

14. The method of claim 13, wherein adapting further includes performing (i) a dynamic range adaptation on image pixels of the HDR video signal that are fully original video, (ii) no dynamic range adaptation being applied to pixels that are fully overlay, and (iii) varying degrees of dynamic range adaptation being applied to pixels that are part original video, part overlay, dependent on a ratio of video to overlay.

15. An apparatus for encoding a video signal, the apparatus comprising:
 a merger device having an input for receiving an HDR video image signal, the merger device for merging the HDR video image signal with one or more overlay signals to form a merged video signal;
 a processor, operatively coupled to the merger device, for generating one or more values indicating, for a pixel in the merged video signal, a merging property indicative of a property of the merging in the HDR video image signal with the one or more overlay signals for that pixel in the merged video signal; and
 an encoder, operatively coupled to the merger device and the processor, for encoding for said pixel said one or more values in one or more least significant bits of one or more color components of a pixel value for the pixel in the merged video signal,
 wherein the merged video signal encoded with said one or more values enables (i) a dynamic range adaptation of video image pixels merged with one or more overlay in the merged video signal to be different from (ii) a dynamic range adaptation of non-merged video image pixels in the merged video signal, in dependence on the one or more values that indicate said merging property for a respective pixel, to be rendered on a display device.

16. The apparatus of claim 15, wherein the merging property comprises a property indicative of at least one of (i) a merging type for said pixel and (ii) an amount of merging of the input HDR video image signal and the one or more overlay signals.

17. The apparatus of claim 15, wherein the encoder is further arranged to provide to the merged video signal an information signal that comprises information on a property of the encoding of the one or more values in the one or more least significant bits.

18. The apparatus of claim 15, wherein the merging property comprises at least one property indicative that a pixel comprises first overlay content, the first overlay content originating from at least one of (i) an overlay signal that comprises locally generated graphic content or (ii) an overlay signal that comprises a second video image signal which includes merged overlay content.

19. A method of encoding a video signal, the method comprising:
 merging, via a merger device, an input HDR video image signal with one or more overlay signals to form a merged video signal,
 generating, via a processor operatively coupled to the merger device, one or more values indicating, for a pixel in the merged video signal, a merging property indicative of a property of the merging in the HDR video image signal with the one or more overlay signals for that pixel in the merged video signal; and
 encoding, via an encoder operatively coupled to the merger device and the processor, for said pixel said one or more values in one or more least significant bits of one or more color components of a pixel value for the pixel in the merged video signal, wherein the merged video signal encoded with said one or more values enables (i) a dynamic range adaptation of video image pixels merged with one or more overlay in the merged video signal to be different from (ii) a dynamic range adaptation of non-merged video image pixels in the merged video signal, in dependence on the one or more values that indicate said merging property for a respective pixel, to be rendered on a display device.

* * * * *